(12) United States Patent
Kawamura

(10) Patent No.: US 9,835,820 B2
(45) Date of Patent: Dec. 5, 2017

(54) LENS BARREL AND IMAGING APPARATUS

(71) Applicant: RICOH IMAGING COMPANY, LTD., Tokyo (JP)

(72) Inventor: Masahiko Kawamura, Saitama (JP)

(73) Assignee: RICOH IMAGING COMPANY, LTD., Tokyo (JP)

( * ) Notice: Subject to any disclaimer, the term of this patent is extended or adjusted under 35 U.S.C. 154(b) by 78 days.

(21) Appl. No.: 14/823,350

(22) Filed: Aug. 11, 2015

(65) Prior Publication Data

US 2016/0054538 A1    Feb. 25, 2016

(30) Foreign Application Priority Data

Aug. 21, 2014   (JP) ................. 2014-168264

(51) Int. Cl.
| | | |
|---|---|---|
| *G02B 7/00* | (2006.01) | |
| *G02B 7/10* | (2006.01) | |
| *G02B 7/02* | (2006.01) | |
| *G02B 7/04* | (2006.01) | |

(52) U.S. Cl.
CPC .............. *G02B 7/102* (2013.01); *G02B 7/00* (2013.01); *G02B 7/02* (2013.01); *G02B 7/026* (2013.01); *G02B 7/04* (2013.01); *G02B 7/10* (2013.01)

(58) Field of Classification Search
CPC . G02B 7/102; G02B 7/00; G02B 7/02; G02B 7/026; G02B 7/04; G02B 7/10
USPC ................. 359/825, 823, 822, 819, 811, 642
See application file for complete search history.

(56) References Cited

U.S. PATENT DOCUMENTS

| 5,485,003 | A | * | 1/1996 | Kusada | .................. | G02B 7/346 |
|---|---|---|---|---|---|---|
| | | | | | | 250/201.8 |
| 9,103,967 | B2 | | 8/2015 | Iikawa et al. | | |
| 2002/0164162 | A1 | * | 11/2002 | Onozuka | ............... | G03B 17/02 |
| | | | | | | 396/85 |
| 2008/0024889 | A1 | * | 1/2008 | Idemura | ................. | G02B 7/102 |
| | | | | | | 359/824 |
| 2008/0170845 | A1 | * | 7/2008 | Kurosawa | .............. | G03B 13/34 |
| | | | | | | 396/133 |
| 2011/0188137 | A1 | * | 8/2011 | Ozawa | ..................... | G02B 7/04 |
| | | | | | | 359/824 |
| 2012/0075731 | A1 | | 3/2012 | Iikawa et al. | | |

FOREIGN PATENT DOCUMENTS

| JP | 02-071216 | 3/1990 |
|---|---|---|
| JP | 2012-072786 | 4/2012 |

* cited by examiner

*Primary Examiner* — William R Alexander
(74) *Attorney, Agent, or Firm* — Greenblum & Bernstein, P.L.C.

(57) ABSTRACT

A lens barrel includes a lens drive ring actuated to drive a lens group along an optical axis, a driving direction detector detecting a driving direction of the lens drive ring, an actuator actuating the lens drive ring, a power transmission mechanism transmitting a driving force of the actuator to the lens drive ring, a manual operation member to manually move the lens drive ring, and a lens-driving controller controlling the actuator to drive the lens drive ring to move the movable lens group. When the lens drive ring is driven, the lens-driving controller controls a driving output of the actuator according to whether or not a first driving direction of the lens drive ring detected immediately before the lens drive ring is driven and a currently-detected second driving direction of the lens drive ring are mutually identical.

14 Claims, 15 Drawing Sheets

Set Data on Previous Driving Direction to 0 (Retreat)

S2-1

POWER ON PROCESS

Previous Driving Direction = 0 (Retreat)

END

| Retreat | 0 |
| --- | --- |
| Advancement | 1 |
| Undefined | 2 |

0 Level Check Points at Rising and Falling Edge-Triggered Interrupts

※Note that signal patterns in the advancing and retreating directions may be opposite to the above.

0 Level Check Points at Rising and Falling Edge-Triggered Interrupts

※Note that signal patterns in the advancing and retreating directions may be opposite to the above.

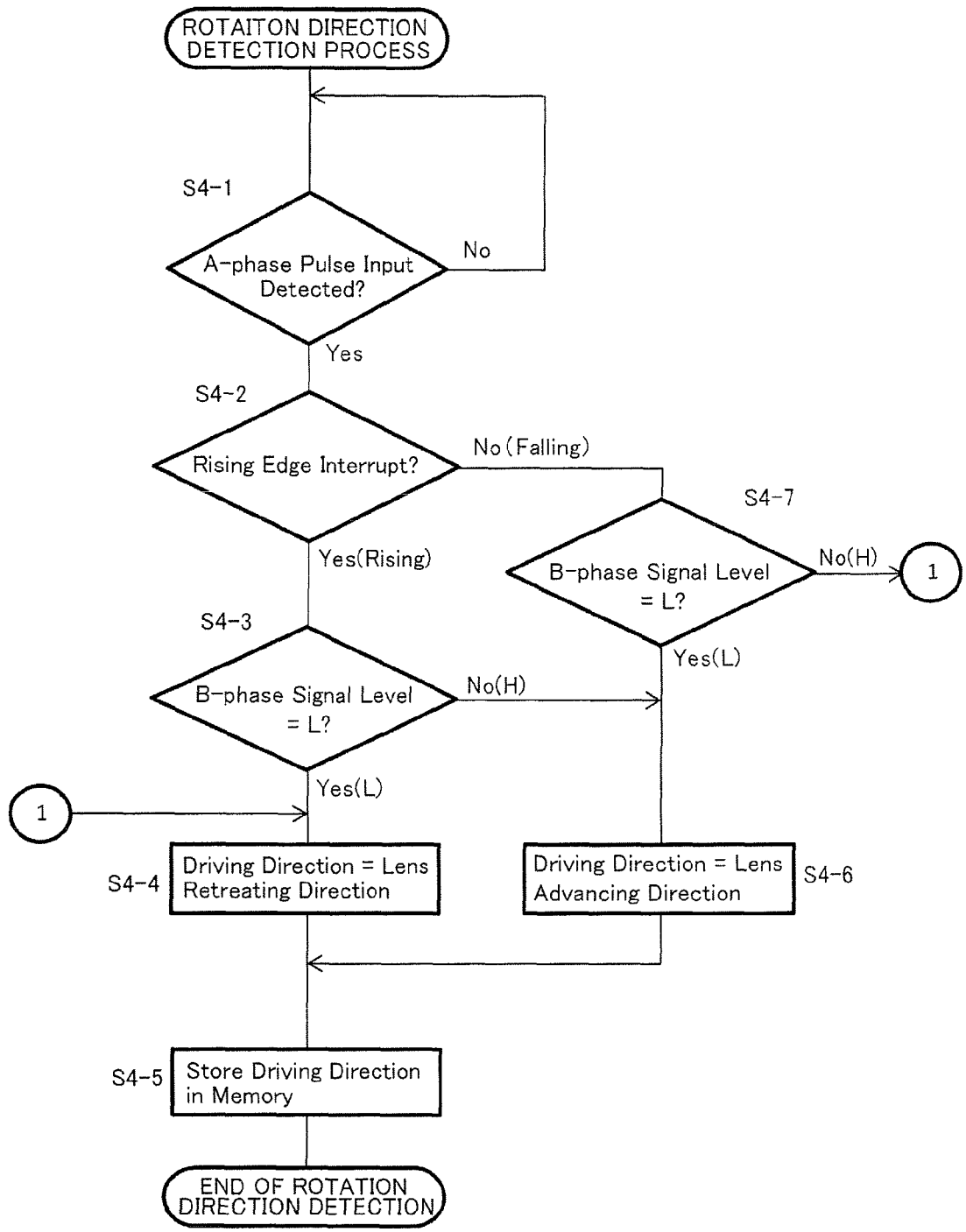

Set Data on Previous Driving Direction to 2 (Undefined)

Set Flag indicating Immediately Following Power-ON

LENS BARREL AND IMAGING APPARATUS

BACKGROUND OF THE INVENTION

Field of the Invention

The present invention relates to a lens barrel and an imaging apparatus with which picture taking is possible in AF mode and MF mode.

Atypical lens barrel with which picture taking is possible in AF mode and MF mode (i.e., a typical MF/AF lens) is provided with a lens system, a lens drive ring, a motor (actuator), a gear mechanism, a manual operation ring (manual control ring) and an AF controller. The lens system includes a movable lens group (e.g., a focusing lens group) movable forward and backward along an optical axis, the lens drive ring moves the movable lens group forward and backward along the optical axis by rotating about the optical axis, the motor generates a driving force for rotating the lens drive ring, the gear mechanism transmits the driving force of the motor to the lens drive ring, and the manual operation ring is manually rotated about the optical axis to rotate the lens drive ring. The camera body to which the lens barrel is mounted is provided with a distance measurer which measures the distance to an object. The AF controller drives the motor based on the result of the measurement by the distance measurer to move the focusing lens group to bring the object into focus.

Upon a shutter release button provided on the camera body to which the lens barrel is mounted being depressed halfway by a photographer (user), the AF controller sends a signal to the motor to cause the motor to rotate by a predetermined amount, and the rotating force of the motor is transmitted to the lens drive ring via the gear mechanism to rotate the lens drive ring. Thereupon, the movable lens group moves by a predetermined amount along the optical axis to thereby focus the lens system on the object. In addition, manually rotating the manual operation ring causes this rotating force thereof to be transmitted to the lens drive ring, thus causing the movable lens group to move along the optical axis.

The gear mechanism, which is for transmitting the driving force of the motor to the lens drive ring, is designed so that backlash is intentionally created therein. Accordingly, when an autofocusing operation is performed, e.g., by rotating the motor in the reverse direction immediately after an autofocusing operation is performed by rotating the motor in the forward direction, backlash in the rotating direction of the motor is created in the gear mechanism. On the other hand, when an autofocusing operation is performed, e.g., by rotating the motor in one direction immediately after an autofocusing operation is performed by rotating the motor in the same direction, no backlash in the rotating direction of the motor is created in the gear mechanism (though backlash in the direction reverse to the rotating direction of the motor is created). In such a case, if the rotational output (duty) of the motor is made identical in magnitude to that in the case where no backlash in the rotational direction of the motor is created in the gear mechanism, there is a possibility of the gear mechanism creating a great impulsive force upon gears of the gear mechanism engaging (colliding) with each other after idling by an amount corresponding to the backlash in the gear mechanism. In addition, there is a possibility of swift rotations of the gears of the gear mechanism causing the movable lens group to move to a position (slightly) beyond an original in-focus position.

To overcome such a problem, it is conventionally the case that the lens barrel is provided with a motor rotation direction detector which detects the rotation direction of the motor and is connected to the AF controller. Upon an autofocusing operation being performed in the lens barrel having such a structure, the motor rotation direction detector detects the current rotation direction of the motor, and the result of this detection (rotation direction) is temporarily stored in a memory provided in the lens barrel (or the camera body). Thereafter, upon the motor rotation direction detector detecting the rotation direction of the motor in response to the execution of the autofocusing operation, the AF controller compares the result of the detection of the current rotation direction of the motor with the result of the detection stored in the aforementioned memory. When these two results are mutually identical (when the previous rotation direction and the current rotation direction of the motor are the same), the AF controller determines that there is no backlash in the motor rotation direction. On the other hand, when the two results are mutually different (when the previous rotation direction and the current rotation direction of the motor are different from each other), the AF controller determines that there is backlash in the motor rotation direction. When the AF controller determines that there is no backlash in the motor rotation direction, the AF controller makes the motor rotate with a normal rotational output (normal duty). On the other hand, when the AF controller determines that there is backlash in the motor rotation direction, the AF controller makes the motor rotate with a low rotational output (low duty) smaller than the normal rotational output (normal duty). Thereafter, upon detecting that backlash in the motor rotation direction has disappeared, the AF controller increases the rotational output of the motor to the normal rotational output to move the movable lens group to an in-focus position with the normal rotational output. According to this control method, there is no possibility of the above described problem arising even if an autofocusing operation is performed when backlash is present in the motor rotation direction in the gear mechanism.

Patent Literature 1: Japanese Unexamined Patent Publication No. H02-71216

When a photographer (user) takes pictures using a camera that is capable of shooting in AF mode and MF mode, sometimes the he or she is required to auto-focus the camera first and subsequently manually focus the camera. Namely, sometimes a manual focusing operation is performed when photographing in AF mode in addition to the normal MF mode, so that manual focusing operation tends to be heavily used. Therefore, whether or not there is backlash in the motor rotation direction in the gear mechanism cannot be determined according to the conventional control method in the case where an autofocusing operation is performed immediately after a manual focusing operation using the manual operation ring is performed. Hence, in this case, the above described problem cannot be solved.

SUMMARY OF THE INVENTION

The present invention provides a lens barrel (or an imaging apparatus) capable of performing operations to drive a movable lens group in accordance with the presence or absence of backlash in the driving direction of an actuator, for driving the movable lens group, even when performing an operation to motor-drive the movable lens group immediately after a manual operation to move the movable lens group manually using a manual operation ring is performed.

According to an aspect of the present invention, a lens barrel is provided, including a lens drive ring which is actuated to drive a movable lens group along an optical axis; a driving direction detector which detects a driving direction of the lens drive ring; an actuator which actuates the lens drive ring; a power transmission mechanism which transmits a driving force of the actuator to the lens drive ring; a manual operation member which is manually moved to actuate the lens drive ring; and a lens-driving controller which controls operations of the actuator to drive the lens drive ring to thereby move the movable lens group along the optical axis. When the lens drive ring is driven, the lens-driving controller controls a driving output of the actuator according to whether or not a first driving direction of the lens drive ring that is detected by the driving detection detector immediately before the lens drive ring is driven and a second driving direction of the lens drive ring that is currently detected by the driving detection detector are mutually identical.

It is desirable for the lens-driving controller to reduce the driving output of the actuator so that the driving output of the actuator is smaller when the first driving direction and the second driving direction of the lens drive ring are mutually different than the driving output of the actuator when the first driving direction and the second driving direction of the lens drive ring are mutually identical.

Upon startup of the actuator until when backlash in the power transmission mechanism is eliminated, it is desirable for the lens-driving controller to reduce the driving output of the actuator so that the driving output of the actuator is smaller when the first driving direction and the second driving direction of the lens drive ring are mutually different than the driving output of the actuator when the first driving direction and the second driving direction of the lens drive ring are mutually identical.

It is desirable for the power transmission mechanism to include a power transmission clutch which actuates the lens drive ring without transmitting the driving force of the actuator to the manual operation member when the actuator is actuated, and which actuates the lens drive ring without transmitting an operating force of the manual operation member to the actuator when the manual operation member is operated.

It is desirable for the driving direction detector to detect the driving direction of the lens drive ring by directly detecting a rotation of the lens drive ring.

It is desirable for the driving direction detector to include a first detector which detects whether or not the lens drive ring operates at a first phase, and a second detector which detects whether or not the lens drive ring operates at a second phase, which is different from the first phase.

According to another embodiment, an imaging apparatus is provided, including a lens drive ring which is actuated to drive a movable lens group along an optical axis, a driving direction detector which detects a driving direction of the lens drive ring, an actuator which actuates the lens drive ring; a power transmission mechanism which transmits a driving force of the actuator to the lens drive ring, a manual operation member which is manually moved to actuate the lens drive ring, and a lens-driving controller which controls operations of the actuator to drive the lens drive ring to thereby move the movable lens group along the optical axis. When the lens drive ring is driven, the lens-driving controller controls a driving output of the actuator according to whether or not a first driving direction of the lens drive ring that is detected by the driving detection detector immediately before the lens drive ring is driven and a second driving direction of the lens drive ring that is currently detected by the driving detection detector are mutually identical.

According to the present invention, a lens barrel (or an imaging apparatus) is provided which is capable of performing operations to drive a movable lens group in accordance with the presence or absence of backlash in the driving direction of an actuator, for driving the movable lens group, even when performing an operation to motor-drive the movable lens group immediately after a manual operation to move the movable lens group manually using a manual operation ring is performed.

The present disclosure relates to subject matter contained in Japanese Patent Application No. 2014-168264 (filed on Aug. 21, 2014) which is expressly incorporated herein by reference in its entirety.

BRIEF DESCRIPTION OF THE DRAWINGS

The invention will be described below in detail with reference to the accompanying drawings, in which:

FIG. 9 is a flow chart of a subroutine shown in FIG. 6, illustrating the method of determining the moving direction of the movable lens group;

DESCRIPTION OF THE EMBODIMENTS

Figure 1:
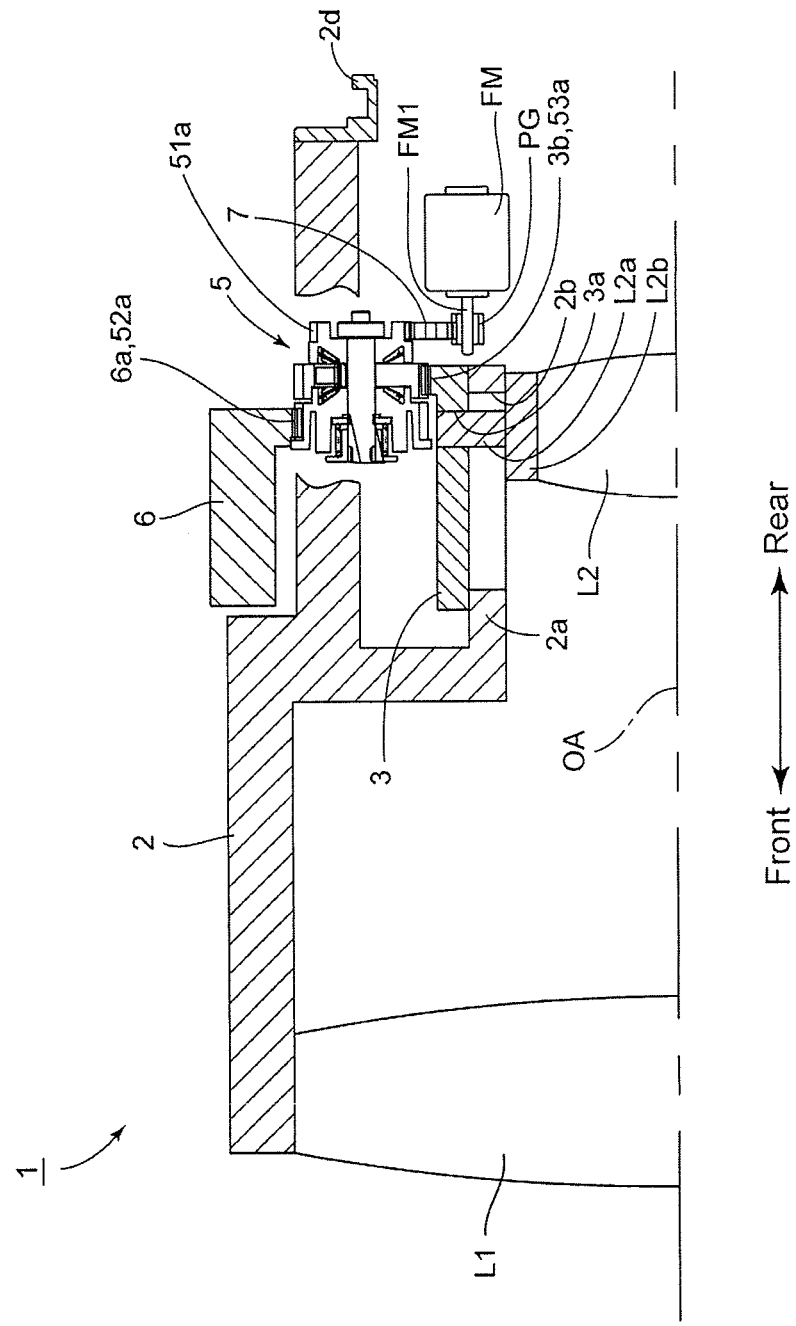
FIG. 1 is a longitudinal sectional view of an upper half of an embodiment of a lens barrel according to the present invention.

An embodiment of a lens barrel according to the present invention will be hereinafter discussed with reference to FIGS. 1 through 12. Directions described in the following description are defined based on the directions of arrows shown in the drawings. The lens barrel 1 is provided with a stationary barrel 2, a lens drive ring 3 and a manual operation ring (manual operation member/manual control ring) 6. The stationary barrel 2 is an annular member with its center on an optical axis OA. The lens barrel 1 is provided with a photographing optical system including a first lens group L1 and a second lens group (movable lens group) L2 positioned behind the first lens group L1. The first lens group L1 is fixedly fitted into the front end of the stationary barrel 2. The stationary barrel 2 is provided at the rear thereof with a support portion 2a which is positioned radially inside the outer periphery of the stationary barrel 2 and is shaped into a ring with its center on the optical axis OA. The stationary barrel 2 is further provided on the support portion 2a with linear guide grooves 2b (only one of which is shown in FIG. 1) which extend parallel to the optical axis OA. The stationary barrel 2 is provided at the rear end thereof with a lens mount 2d which is detachably attached to a mount (not shown in FIG. 1) provided on the camera body 10. The lens drive ring 3 is fitted on the outer periphery of the support portion 2a to be rotatable about the optical axis OA and immovable along the optical axis OA relative to the outer periphery of the support portion 2a. The lens drive ring 3 is provided with cam grooves 3a (only one of which is shown in FIG. 1) which are inclined with respect to the linear guide grooves 2b. The lens drive ring 3 is further provided at the rear end of the outer peripheral surface thereof with an outer gear 3b. The second lens group L2 that serves as a focusing lens group is positioned radially inside the support portion 2a and is supported by a lens support frame L2b. This lens support frame is provided with cam followers L2a (only one of which is shown in FIG. 1) which are formed to project radially outwards to be engaged in the linear guide grooves 2b and the cam grooves 3a so as to be movable relative thereto. The manual operation ring 6 is fitted on the outer periphery of the rear of the stationary barrel 2 and is rotatable about the optical axis OA while being immovable in the optical axis direction (i.e., the direction of the optical axis OA) relative to the stationary barrel 2. The manual operation ring 6 is provided on the rear end of the inner peripheral surface thereof with an inner gear 6a. The lens barrel 1 is provided, in the internal space of the stationary barrel 2 in the vicinity of the rear end of this internal space, with a focusing motor (actuator/AF motor) FM configured from a DC motor (electromagnetic motor) which is installed in a fixed state. A rotary output pinion gear PG is fixedly fitted on an output shaft FM1 of the focusing motor FM. The lens barrel 1 is fixedly provided therein with an MR sensor (electromagnetic sensor/driving direction detector) 9 capable of directly detecting the rotation direction of the lens drive ring 3. The MR sensor 9 incorporates two detectors 9a and 9b which detect the rotation of the lens drive ring 3 at difference phase angles. Upon the lens drive ring 3 rotating, each detector 9a and 9b detects the rotation of the lens drive ring 3 (it is possible to determine the rotation direction of the lens drive ring 3 from the results of detection of the detectors 9a and 9b) and outputs the result of the detection to a lens-controlling microcomputer 8c (see FIG. 5).

The outer gear 3b of the lens drive ring 3, the inner gear 6a of the manual operation ring 6 and a power transmission clutch 5 are positioned inside the stationary barrel 2. The power transmission clutch 5 operates in association with the rotary output pinion gear PG that is fixed onto the output shaft FM1 of the focusing motor FM. The power transmission clutch 5 is provided with a rotational-center shaft 50, an output gear 53, a first input gear 51 and a second input gear 52 which are provided as major elements of the power transmission clutch 5. The rotational-center shaft 50 is irrotational, and the axis thereof extends in the optical axis direction. The output gear 53 is supported on the rotational-center shaft 50 to be rotatable coaxially with the rotational-center shaft 50. The first input gear 51 and the second input gear 52 are supported by the rotational-center shaft 50 to be rotatable coaxially with the rotational-center shaft 50 and are positioned immediately behind and in front of the output gear 53, respectively. The first input gear 51, the second input gear 52 and the output gear 53 are circular disc-shaped spur gears, and teeth 51a, 52a and 53a are formed on the circumferential surfaces of the first input gear 51, the second input gear 52 and the output gear 53, respectively. The teeth 53a of the output gear 53 is in mesh with the outer gear 3b of the lens drive ring 3, the teeth 51a of the first input gear 51 is in mesh with an idle gear 7 which is in mesh with the rotary output pinion gear PG of the focusing motor FM, and the second input gear 52 is in mesh with the inner gear 6a of the manual operation ring 6 (the idle gear 7 can be configured from a reduction gear).

Figure 2:
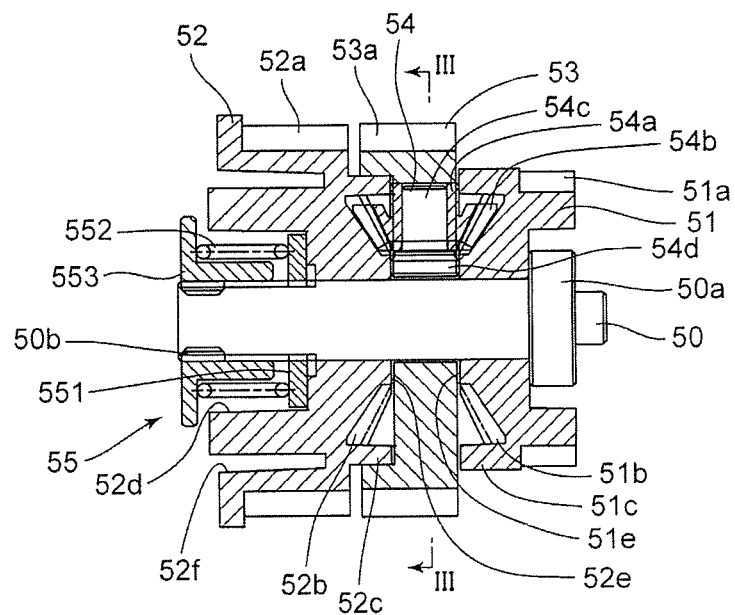
FIG. 2 is a longitudinal sectional view of a power transmission clutch provided in the lens barrel shown in FIG. 1.
Figure 3:
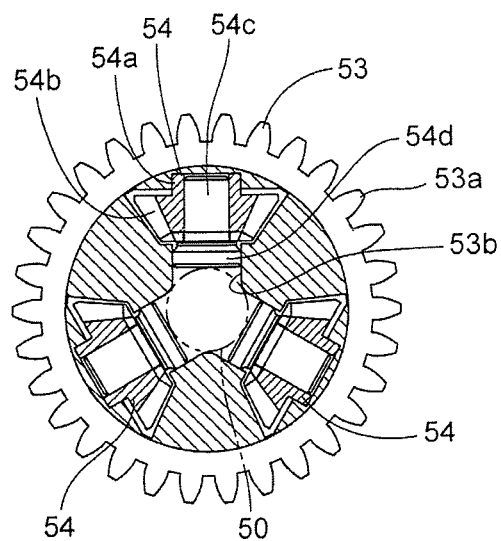
FIG. 3 is a sectional view taken along the line III-III shown in FIG. 2.
Figure 4:
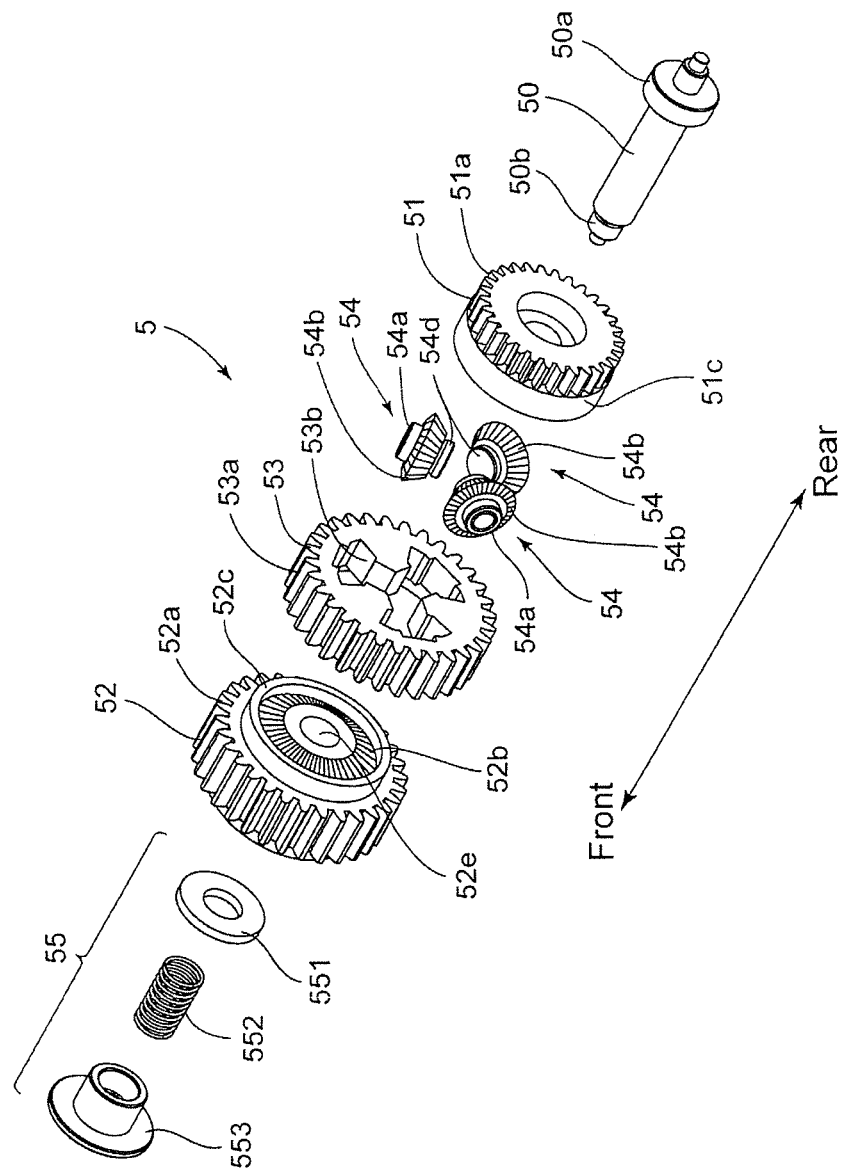
FIG. 4 is an exploded perspective view of the power transmission clutch.
Figure 5:
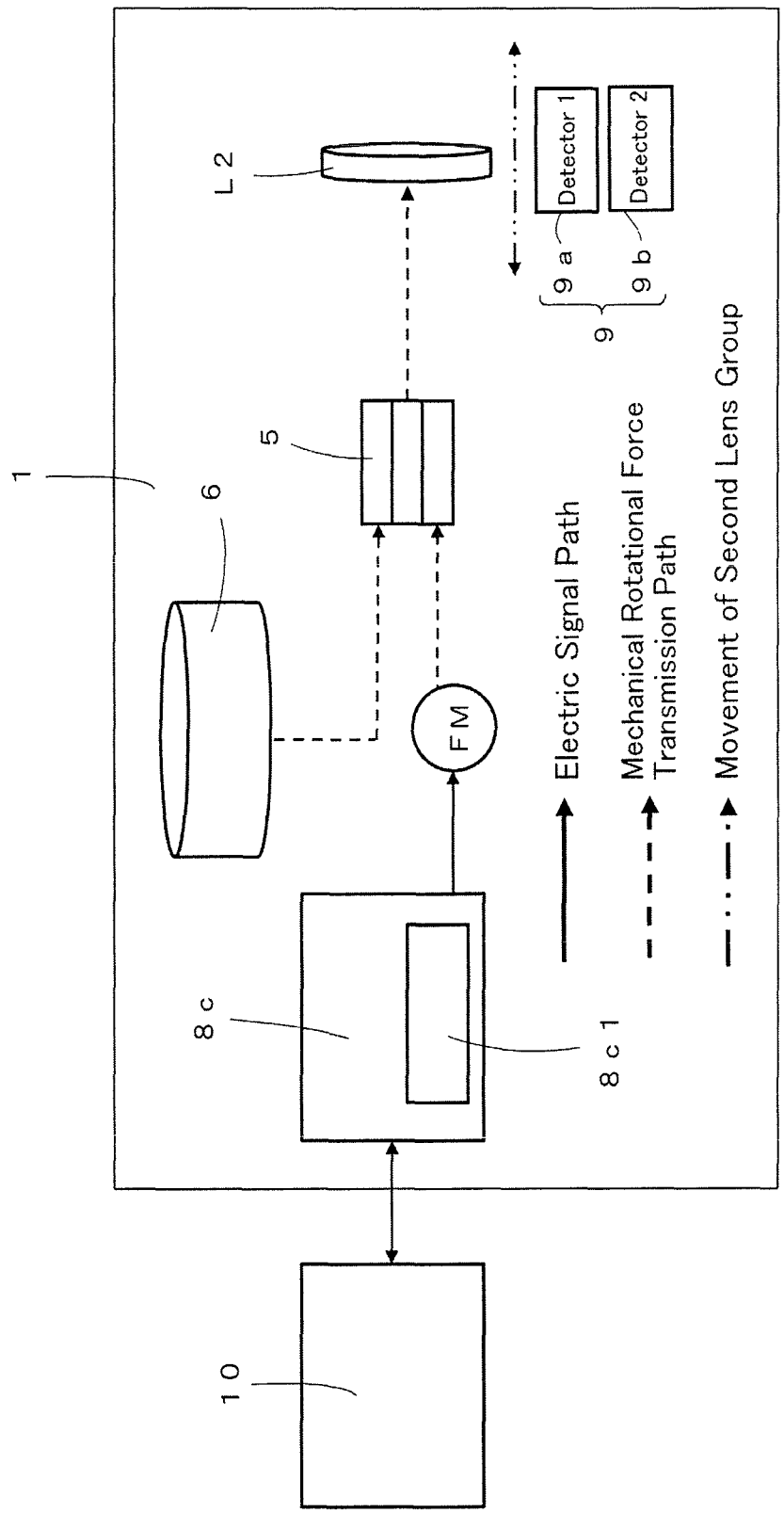
FIG. 5 is a schematic block diagram showing the lens barrel and a camera body to which the lens barrel is mounted.
Figure 6:
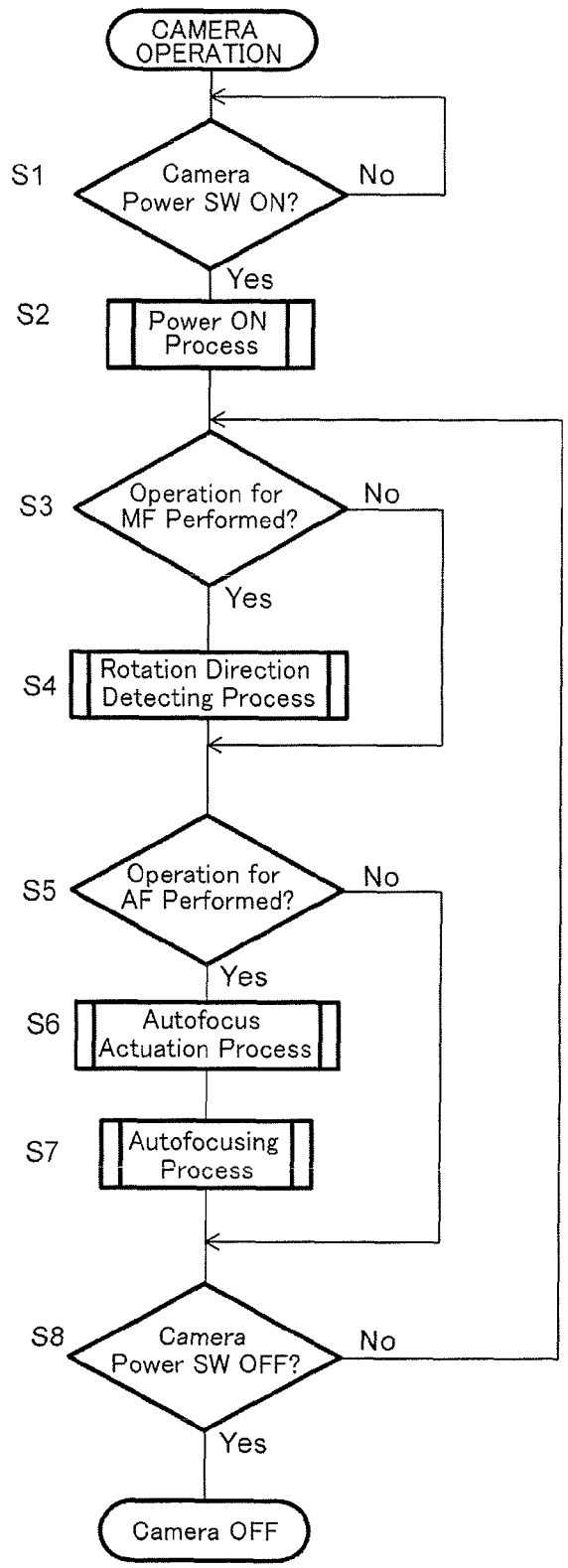
FIG. 6 is a flow chart illustrating operations of the camera equipped with the lens barrel.
Figure 7:
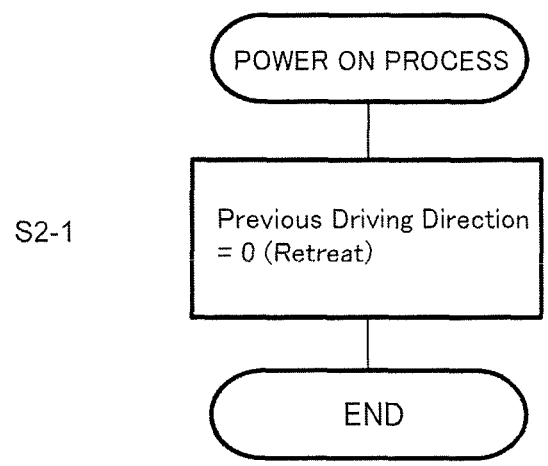
FIG. 7 is a flow chart of a subroutine shown in FIG. 6, illustrating an operation when a power ON process is performed.
Figure 8A:
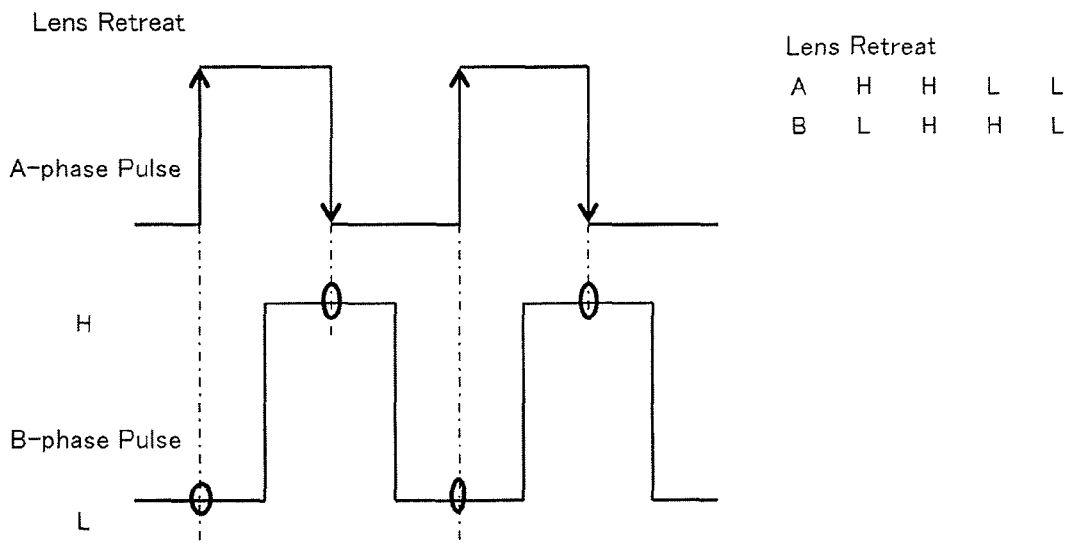
FIG. 8A is a diagram illustrating a method of determining the lens-retreating direction of a movable lens group.
Figure 8B:
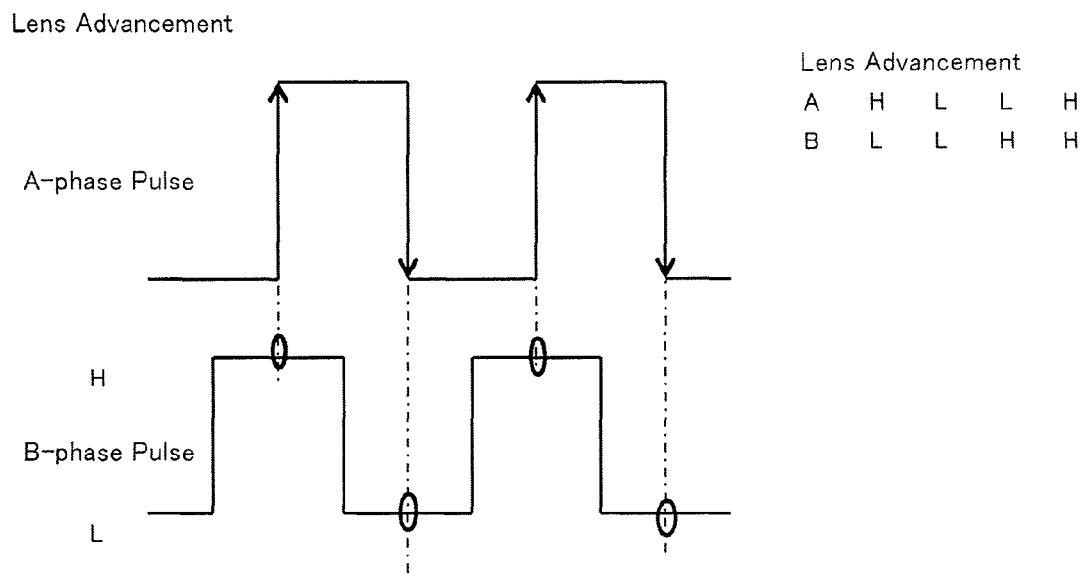
FIG. 8B is a diagram illustrating a method of determining the lens-advancing direction of the movable lens group.

The power transmission clutch 5 will be hereinafter discussed in detail with reference to FIG. 2, which shows an enlarged sectional view of the power transmission clutch 5 taken along the optical axis OA, FIG. 3, which shows an enlarged sectional view of the output gear 53 taken along a direction orthogonal to the optical axis OA, and FIG. 4 which shows an exploded perspective view of the power transmission clutch 5. A trefoil shaped (three-lobed leaf shaped) through-hole cavity 53b, each lobe shape thereof extending in radial directions from the shaft center of the rotational-center shaft 50, is formed in the output gear 53 at the center thereof. The through-hole cavity 53b incorporates three planetary bevel gears 54, each rotational shaft thereof extending in radial directions. Each of the three planetary bevel gears 54 is provided with a shaft portion 54a which constitutes one end (radially outer end with respect to the output gear 53) of the planetary bevel gear 54 and is further provided with a bevel gear portion 54b which is integrally formed with the shaft portion 54a. A reinforcing metal shaft 54c is coaxially fixedly fitted into the shaft portion 54a, and one end (radially inner end with respect to the output gear 53) of the metal shaft 54c constitutes a shaft portion 54d that is positioned on the opposite side (inner side) of the metal shaft 54c from the shaft portion 54a. In addition, the first and second input gears 51 and 52 are provided, on surfaces thereof which face the output gear 53, with sun bevel gears 51b and 52b, respectively, which are conically beveled, protrude toward each other and are engaged with the planetary bevel gears 54. The first and second input gears 51 and 52 are provided, on inner facing surfaces thereof which face the output gear 53, with sleeves (contacting sleeves) 51c and 52c which are formed integral with the first and second input gears 51 and 52, respectively, so as to protrude therefrom toward the output gear 53. The sleeves 51c and 52c are formed into annular rings and surround the circumferences of the sun bevel gears 51b and 52b, respectively. In addition, the sleeve 51c is formed so that the end face thereof is positioned at the same position as the top face 51e of the sun bevel gear 51b in the axial direction (the axial direction of the first input gear 51 and the second input gear 52) and the sleeve 52c is formed so that the end face thereof is positioned at the same position as the top face 52e of the sun bevel gear 52b in the axial direction (the axial direction of the first input gear 51 and the second input gear 52). In other words, the end face of the sleeve 51c and the top face 51e of the sun bevel gear 51b lie in a plane orthogonal to the axis of the rotational-center shaft 50 and the end face of the sleeve 52c and the top face 52e of the sun bevel gear 52b lie in a plane orthogonal to the axis of the rotational-center shaft 50. Additionally, by arranging the first input gear 51 and the second input gear 52 on both sides of the output gear 53, in the optical axis direction, with the three planetary bevel gears 54 installed in the through-hole cavity 53b of the output gear 53, the bevel gear portion 54b of each planetary bevel gear 54 engages with the sun bevel gears 51b and 52b of the first and second input gears 51 and 52. In addition, the shaft portion 54a of each planetary bevel gear 54, which is formed at one end thereof, is sandwiched and held, with respect to the optical axis direction (i.e., the direction of the optical axis OA), between the end faces of the sleeves 51c and 52c, which are positioned to face each other in the optical axis direction, while the shaft portion 54d of each planetary bevel gear 54, which is formed at the other end thereof, is sandwiched and held, with respect to the optical axis direction between the top faces 51e and 52e of the sun bevel gears 51b and 52b, which are positioned to face each other in the optical axis direction (see FIG. 2).

The rotational-center shaft 50 is inserted into the center hole of the first input gear 51 in a manner to allow the first input gear 51 to rotate on the rotational-center shaft 50, and the first input gear 51 is prevented from coming off the rotational-center shaft 50 by abutment of a rear surface of the first input gear 51 axially against a large-diameter stopper 50a provided at the rear end of the rotational-center shaft 50. In addition, the rotational-center shaft 50 is inserted into the center hole of the second input gear 52 in a manner to allow the second input gear 52 to rotate on the rotational-center shaft 50, a cavity 52d in the shape of a circle about the axis of the rotational-center shaft 50 is formed in the front of the second input gear 52, and a torque adjuster 55 for adjusting a holding torque and a rotational torque, which will be discussed later, is installed in the cavity 52d. The torque adjuster 55 is provided with a circular shaped washer (abutting member) 551 that is in contact with the inner base surface of the cavity 52d, a coil spring (resilient member) 552, one end thereof being in contact with (resiliently abutting against) the front-side surface of the washer 551, and an adjusting nut 553 having a female thread which is engaged with a male thread 50b formed at the front end of the rotational-center shaft 50. The adjusting nut 553 has an integrated flange, the rear side of which comes in contact with the other end of the coil spring 552 in the axial direction. In the torque adjuster 55, the deflection amount of the coil spring 552 is adjusted by adjusting the axial engagement position of the adjusting nut 553 with respect to the rotational-center shaft 50, whereby the resilient abutting force of the washer 551 against the inner base surface (outer side surface of the second input gear 52) of the cavity 52d is adjusted. Accordingly, due to the frictional force generated by the abutting force of the washer 551, the rotational resistance of the second input gear 52, i.e., the rotational torque, can be adjusted. The washer 551 is made of a material having a large friction coefficient, so that the frictional force becomes larger when the washer 551 abuts against the inner base surface of the cavity 52d of the second input gear 52. This abutting force exerts an influence on a portion where a rear surface of the first input gear 51 is in contact with the front surface of the stopper 50a; however, the friction coefficient of these two surfaces that are in contact with each other is small, thus being smaller than the torque adjustment amount of the second side gear 52 adjusted by the torque adjuster 55.

As described above, the power transmission clutch 5 is linked with the outer gear 3b of the lens drive ring 3, the inner teeth 6a of the manual operation ring 6 and the idle gear 7, and backlash is present between the outer teeth 3b and the teeth 53a of the outer gear 53, between the inner teeth 6a and the teeth 52a of the second input gear 52, between the rotary output pinion gear PG and the idle gear 7, and between the idle gear 7 and the teeth 51a of the first input gear 51. In addition, backlash is also present between the first input gear 51, the second input gear 52 and the output gear 53 of the power transmission clutch 5 that are connected with one another. Accordingly, cumulative backlash that is an accumulation of the above described backlashes is present in the gear mechanism (power transmission mechanism) which includes the outer teeth 3b of the lens drive ring 3, the power transmission clutch 5, the inner teeth 6a of the manual operation ring 6, the idle gear 7 and the rotary output pinion gear PG.

The second input gear 52 is further provided in the front surface thereof with a ring-shaped cushion groove 52f which is formed coaxially with the rotational-center shaft 50. The cushion groove 52f facilitates the radial elastic deformation of the outer periphery of the second input gear 52, i.e., the teeth 52a that is positioned on the radially outside of the cushion groove 52f. This elastic deformation serves for maintaining a favorable engagement state between the inner teeth 6a of the manual operation ring 6 and the teeth 52a, which will be discussed later.

The lens barrel 1 is provided therein with the lens-controlling microcomputer (AF controller/lens-driving controller; see FIG. 5) 8c that is connected to the MR sensor 9 (which includes detectors 9a and 9b). The lens-controlling microcomputer 8c is connected to the focusing motor FM. In addition, the camera body 10 is provided therein with a battery (not shown), a distance measurer (not shown) and an AF (autofocus) circuit (not shown). Upon a main switch (not shown) provided on the camera body 10 being turned ON with the lens barrel 1 attached to the camera body 10, the power of the battery is supplied to the lens-controlling microcomputer 8c via a power supply circuit (not shown) provided in the lens barrel 1. In addition, communications between a communication IC (not shown) (which is connected to the lens-controlling microcomputer 8c) and the AF circuit are enabled. The lens-controlling microcomputer 8c is provided therein with a buffer memory 8c1, another memory (not shown) and a timer (not shown). Upon the main switch of the camera body 10 being turned ON, "data on the previous driving direction" is established and stored in the aforementioned memory (not shown). During auto focusing (AF operation), the focusing motor FM is driven to rotate upon receiving the result of a calculation of the aforementioned AF circuit. Since the rotating force of the focusing motor FM is transmitted to the first input gear 51 via the rotary output pinion gear PG and the idle gear 7, rotation of the focusing motor FM causes the first input gear 51 to rotate. At this time, the manual operation ring 6 is not in operation and is stationary, and accordingly, the second input gear 52 that is in mesh with the inner teeth 6a of the manual operation ring 6 is stationary. Therefore, the rotation of the first input gear 51 causes the planetary bevel gears 54 to revolve around the rotational-center shaft 50 due to engagement between the sun bevel gear 51$b$ of the first input gear 51 and the planetary bevel gears 54, thus causing the output gear 53, which is integral with the planetary bevel gears 54 in the circumferential direction about the rotational-center shaft 50, to rotate about the rotational-center shaft 50. Since rotation of the output gear 53 is transmitted to the outer gear 3$b$ to thereby cause the lens drive ring 3 to rotate, the second lens group L2 which serves as a focusing lens group, is driven in the optical axis direction inside the stationary barrel 2 due to the engagement between the linear guide grooves 2$b$ and the cam followers L2$a$ and due to the engagement between the cam grooves 3$a$ and the cam followers L2$a$, whereby autofocusing operation is performed.

During manual focusing (MF operation), rotating the manual operation ring 6 manually by a photographer (user) causes the second input gear 52, which is in engagement with the inner gear 6$a$ of the manual operation ring 6, to rotate. At this time, because the focusing motor FM is not driven, the first input gear 51, which is engaged with the focusing motor FM, is stationary. Therefore, the rotation of the second input gear 52 causes the planetary bevel gears 54 to revolve around the rotational-center shaft 50 due to engagement between the sun bevel gear 52$b$ of the second input gear 52 and the planetary bevel gears 54, thus causing the output gear 53, which supports the planetary bevel gears 54, to rotate with the planetary bevel gears 54 about the rotational-center shaft 50. Since rotation of the output gear 53 is transmitted to the outer gear 3$b$ to thereby cause the lens drive ring 3 to rotate, the second lens group L2 is driven in the optical axis direction inside the stationary barrel 2 in a similar manner to the case where autofocusing operation is performed, whereby manual focusing operation is performed.

The holding torque and rotational torque of each gear, shown in FIG. 2 and others, are defined hereinbelow:

Holding torque Th1 (of the first input gear 51) (torque required to rotate the first input gear 51 at rest)=Original holding torque of the first input gear 51 itself+Holding torque of the idle gear 7+Holding torque when the output shaft FM1 of the focusing motor FM is rotated by an external force.

Holding torque Th2 (of the second input gear 52) (torque required to rotate the second input gear 52 at rest) =Original holding torque of the second input gear 52 itself+Holding torque of the manual operation ring 6.

Holding torque To (of the output gear 53)=Original holding torque of the output gear 53 itself+Holding torque of the lens drive ring 3 (including any holding torque converted from the movement force of the second lens group L2).

Rotational torque Tk1 (of the first input gear 51)=Rotational torque of the focusing motor FM−Th1.

Rotational torque Tk2 (of the second input gear 52)=Rotational torque of the manual operation ring 6 that is manually generated−Th2.

Furthermore, the holding torque To at the output gear 53 varies as indicated below:

To=∞: when the second lens group L2 (the lens frame 2) has reached a terminus position (front or rear movement limit) (when the cam followers L2$a$ come in contact with common ends of the linear guide grooves 2$b$, or with stoppers respectively formed to correspond to the cam followers L2$a$ in the case where these stoppers are provided in the vicinity of common ends of the linear guide grooves 2$b$).

To≠∞: when the second lens group L2 (the lens frame 2) has not reached the terminus position (when the cam followers L2$a$ are in noncontact with common ends (or the aforementioned stoppers) of the linear guide grooves 2$b$; namely, when the lens barrel 1 is in a normal operation).

According to the above, in the operation of the power transmission clutch 5, to make the output gear 53 rotate while preventing the second input gear 52 from rotating when the first input gear 51 rotates and to make the output gear 53 rotate while preventing the first input gear 51 from rotating when the second input gear 52 rotates, the following relationship among the holding torque Th1 of the first input gear 51, the holding torque Th2 of the second input gear 52, and the holding torque To of the output gear 53 should be satisfied:

$$Th2 > To, Th1 > To \qquad (1).$$

The output gear 53 should rotate when the first input gear 51 or the second input gear 52 rotates, so that the holding torque Th2 of the second input gear 52 can be any of the following three conditions: Th2=Th1, Th2>Th1, and Th2<Th1.

When the gear mechanism 5 is applied to a lens barrel, for the purpose of carrying out the same operation as above, each of the aforementioned holding torques Th1, Th2 and To and rotational torques Tk1 and Tk2 should satisfy the following conditions at either time the lens barrel 1 is driven by the focusing motor FM or manually.

(During Operation of the Focusing Motor FM)

In the case where To=∞, the following condition should be maintained:

$$Th2 > Tk1 \qquad (2).$$

After the second lens group L2 reaches the terminus position (i.e., after To becomes equal to ∞) by being driven in one direction, the second lens group L2 does not move even when the focusing motor FM is driven to further move the second lens group L2 in the aforementioned one direction; however, in this case, to prevent the manual operation ring 6 from rotating, the condition Th2>Tk1 should be maintained in the case where To=∞.

In the case where To≠∞, the following conditions should be maintained:

$$Th2 > To \text{ and } Tk1 > To \qquad (3).$$

In this case, the second lens group L2 will move as long as each of Th2 and Tk1 is larger than To; the question of which torque of Th1 and Tk2 is larger makes no difference. In this case, it is desirable that Th2 be set as large as positively possible to prohibit rotation of the manual operation ring 6 (to make Th2 larger than To).

(During Manual Drive)

In the case where To=∞ (in the case of Th1<To, and Tk1<To), the following conditions should be maintained:

$$Th1 > Tk2 \text{ or } Th1 < Tk2 \qquad (4).$$

In this case, the focusing motor FM rotates with the rotation of the manual focus ring.

In the case where To≠∞, the following conditions should be maintained:

$$Th1 > To \text{ and } Tk2 > To \qquad (5).$$

In this case, the second lens group L2 will move by rotating the manual operation ring 6, as long as each of Th1 and Tk2 is larger than To; the question of which torque of Th1 and Tk2 is larger makes no difference.

The lens barrel 1 has been designed so as to satisfy the aforementioned conditions (1), (2), (3), (4) and (5).

As discussed above, the torque adjuster 55 carries out a torque adjustment on each of the gears 51, 52 and 53 via adjustment of engagement position of the adjusting nut 553. Specifically, in the torque adjuster 55, when the deflection amount of the coil spring 552 increases by the adjusting nut 553, the abutting force of the washer 551 against the side surface of the input gear 52 becomes larger, and this abutting force is transmitted to the output gear 53 via the sleeve 52c and the end surface 52e of the sun bevel gear 52b. This abutting force is further transmitted, from the output gear 53, to the sleeve 51c and the end surface 51e of the sun bevel gear 51b, i.e., to the first input gear 51. Hence, since the washer 551 may be made of any material having large friction coefficient, a large friction force can be obtained, thus the holding torque of the second input gear 52 can be set to the largest possible value.

In regard to the torque adjustment, the engagement state of the adjusting nut 553 should be adjusted in such a manner that, for example, during movement of the second lens group L2 by the rotating drive of the focusing motor FM, the manual operation ring 6 does not rotate. The second lens group L2 can also move by rotation of the manual operation ring 6 when the focusing motor FM is not driven; however, the adjusting nut 553 should be adjusted in such a manner that the rotation of the manual operation ring 6 can be carried out even after the second lens group L2 reaches the terminus position so that no more movement is allowed (i.e., after To becomes equal to ∞).

Operations of the lens barrel 1 and the camera body 10 will be hereinafter discussed with reference mainly to FIGS. 6 through 12. As shown in the flow chart shown in FIG. 6, upon the main switch of the camera body 10 connected to the lens barrel 1 being turned ON (YES at S1; this prefix "S" that is added in front of a numeral stands for step), a subroutine "power ON process" is performed at S2. Specifically, the buffer memory 8c1 (the lens-controlling microcomputer 8c) reads out and temporarily stores "data on the previous driving direction" stored in the aforementioned memory (not shown) as shown at S2-1 in the subroutine shown in FIG. 7. In the present embodiment, the data on the previous driving direction is set at "0 (lens retreat)". Namely, the data on the previous driving direction is stored in the aforementioned memory (not shown) as information (assumptive information) on the previous driving direction of the second lens group L2 being the lens retreating direction (i.e., the direction toward the photographer's (user's) side (image side)). Subsequently, the lens-controlling microcomputer 8c determines at S3 whether or not a manual operation to start a manual focusing operation has been performed (whether the lens drive ring 3 has been rotated manually by rotation of the manual operation ring 6). In other words, the lens-controlling microcomputer 8c determines at S3 whether or not the MR sensor 9 has output the result of the detection to the lens-controlling microcomputer 8c with a shutter release button provided on the camera body 10 not currently depressed halfway.

If YES at S3, control proceeds to a subroutine "rotation direction detecting process" at S4. As shown in the subroutine in FIG. 9 and the diagram in FIGS. 8A and 8B, the lens-controlling microcomputer 8c determines at S4-1 whether or not the detector 9a of the MR sensor 9 has output the detection result (the result of the detection of a A-phase pulse) (an interrupt processing is performed). If YES at S4-1, the lens-controlling microcomputer 8c determines whether the result of the detection of a A-phase pulse (the signal edge thereof) at this time (moment) is a rising edge or a falling edge. Namely, the lens-controlling microcomputer 8c determines whether the direction of the arrow of the signal edge of the A-phase pulse (pulse wave) shown in FIGS. 8A and 8B at the moment control enters the operation at S4 is up (rising) or down (falling). If the lens-controlling microcomputer 8c determines that the result of the detection of the A-phase pulse (the signal edge thereof) at the moment is a rising edge (if YES at S4-2), the lens-controlling microcomputer 8c determines whether the result of the detection (level) of a B-pulse (different in phase from the A-pulse that the detector 9a outputs) that the detector 9b outputs at the time (moment) the detector 9a generates the rising edge of the A-phase pulse is L (low) or H (high) (S4-3). If YES (L) at step S4-3, the lens-controlling microcomputer 8c determines at S4-4 that the direction of the movement of the second lens group L2 caused by manually rotating the manual operation ring 6 is the lens retreating direction, and subsequently, the lens-controlling microcomputer 8c stores the determination result in the buffer memory 8c1 at S4-5. More specifically, the lens-controlling microcomputer 8c rewrites "0 (=data on the previous driving direction)" that has been stored in the buffer memory 8c1 to "0" (in other words, the lens-controlling microcomputer 8c overwrites "0 (=data on the previous driving direction)" with "0") (S4-5). On the other hand, if NO (H) at S4-3, the lens-controlling microcomputer 8c determines at S4-6 that the direction of the movement of the second lens group L2 caused by manually rotating the manual operation ring 6 is the lens advancing direction (i.e., the direction toward the object), and subsequently, the lens-controlling microcomputer 8c rewrites "0 (=data on the previous driving direction)" that has been stored in the buffer memory 8c1 to "1 (lens advancement)" (in other words, the lens-controlling microcomputer 8c overwrites "0 (=data on the previous driving direction)" with "1") (S4-5). If the lens-controlling microcomputer 8c determines that the result of the detection of the A-phase pulse (the signal edge thereof) at the moment is a falling edge (if NO at S4-2), the lens-controlling microcomputer 8c determines whether the result of the detection (level) of a B-pulse (different in phase from the A-pulse that the detector 9a outputs) that the detector 9b outputs at the time (moment) the detector 9a generates a falling edge of the A-phase pulse is L (low) or H (high) (S4-7). If YES (L) at S4-7, the lens-controlling microcomputer 8c determines at S4-6 that the direction of the movement of the second lens group L2 caused by manually rotating the manual operation ring 6 is the lens advancing direction, and subsequently, the lens-controlling microcomputer 8c rewrites "0 (=data on the previous driving direction)" that has been stored in the buffer memory 8c1 to "1 (lens advancement)" (in other words, the lens-controlling microcomputer 8c overwrites "0 (=data on the previous driving direction)" with "1") (S4-5). On the other hand, if NO (H) at S4-7, the lens-controlling microcomputer 8c determines at S4-4 that the direction of the movement of the second lens group L2 caused by manually rotating the manual operation ring 6 is the lens retreating direction, and subsequently, the lens-controlling microcomputer 8c rewrites "0 (=data on the previous driving direction)" that has been stored in the buffer memory 8c1 to "0" (in other words, the lens-controlling microcomputer 8c overwrites "0 (=data on the previous driving direction)" with "0 (lens retreat)") (S4-5).

Upon completion of the rotation direction detecting process at S4, the lens-controlling microcomputer 8c determines whether or not an autofocusing operation has been performed (whether or not the shutter release button of the camera body 10 has been depressed halfway) (S5). If YES at S5 (when the shutter release button is depressed halfway), control proceeds to a subroutine "autofocus actuation process" at S6. In the subroutine in FIG. 11, the lens-controlling microcomputer 8c determines at S6-1 whether or not the rotation direction in which the lens-controlling microcomputer 8c instructs the focusing motor FM to rotate is the same as that of the data on the previous driving direction stored in the buffer memory 8c1 based on the result of a calculation of the AF circuit having received the result of a measurement by the distance measurer. If YES at S6-1 (the rotation direction of the lens drive ring 3 at this time is the same as the previous rotation direction of the lens drive ring 3), the lens-controlling microcomputer 8c determines that there is no cumulative backlash in the rotation direction of the focusing motor FM (the moving direction of the second lens group L2) (S6-2). In addition, at S6-2, the lens-controlling microcomputer 8c sets DUTY (duty ratio) of the signal (output voltage) that the lens-controlling microcomputer 8c supplies to the focusing motor FM to DUTY1 (normal driving DUTY). Additionally, at S6-2, the lens-controlling microcomputer 8c sets a time t1 using the aforementioned timer that is incorporated in the lens-controlling microcomputer 8c. Subsequently, the lens-controlling microcomputer 8c generates a pulsing output voltage (signal) based on the input voltage of a constant voltage value (from the aforementioned battery) and DUTY1 and supplies this signal to the focusing motor FM to drive the focusing motor FM (S6-3). Subsequently, the lens-controlling microcomputer 8c determines whether or not the MR sensor 9 (the detectors 9a and 9b) has output the detection result (pulse) to the lens-controlling microcomputer 8c (i.e., whether or not the lens drive ring 3 has rotated even slightly) (S6-5). If the MR sensor 9 has output the detection result to the lens-controlling microcomputer 8c (if YES at step S6-5), control proceeds to S6-6, i.e., control again proceeds to the subroutine shown in FIG. 9 to rewrite (overwrite) the data stored in the buffer memory 8c1 (S4-5). Note that, if YES at S6-5, the value of DUTY (DUTY1) of the focusing motor FM at this time is DUTY2 (see FIG. 10). Subsequently, the lens-controlling microcomputer 8c clears and resets the time t1 (S6-7), and subsequently, the lens-controlling microcomputer 8c determines whether or not the number of output pulses of the MR sensor 9 has reached a predetermined number of pulses (S6-8). If YES at S6-8, the lens-controlling microcomputer 8c determines that the lens drive ring 3 has rotated by at least a predetermined amount of rotation (in other words, determines that the lens drive ring 3 has securely commenced to rotate and thus caused the second lens group L2 to move), so that control ends the autofocus actuation process and proceeds to S7. At S6-5, if the lens-controlling microcomputer 8c determines that the MR sensor 9 has not output the detection result to the lens-controlling microcomputer 8c (if NO at step S6-5), the lens-controlling microcomputer 8c determines whether or not the time t1 has elapsed (S6-9). If the time t1 has elapsed (if YES at S6-9), the lens-controlling microcomputer 8c determines that the lens drive ring 3 cannot be rotated with the current DUTY (i.e., DUTY1), thus DUTY is increased by one step from DUTY1 (S6-10). Subsequently, the lens-controlling microcomputer 8c sets a time t3 using the aforementioned timer (S6-11), and control returns to S6-5. Subsequently, if YES at S6-5, the lens-controlling microcomputer 8c clears and resets the time t3 (S6-7) following the process at S6-6 (the value of DUTY of the focusing motor FM of this time is DUTY2 (see FIG. 10)), the lens-controlling microcomputer 8c determines whether or not the number of output pulses of the MR sensor 9 has reached the aforementioned predetermined number of pulses (S6-8), and control ends the autofocus actuation process and proceeds to S7 if the number of output pulses of the MR sensor 9 has reached the aforementioned predetermined number of pulses (if YES at S6-8). If the lens-controlling microcomputer 8c determines that the number of output pulses of the MR sensor 9 has not yet reached the aforementioned predetermined number of pulses (if NO at S6-8) and subsequently determines that the MR sensor 9 has output the detection result to the lens-controlling microcomputer 8c (if YES at step S6-5), the lens-controlling microcomputer 8c clears and resets the time t3 (or t1) following the process at S6-6, and the lens-controlling microcomputer 8c again determines whether or not the number of output pulses of the MR sensor 9 has reached the aforementioned predetermined number of pulses (S6-8). It is sometimes the case that the lens-controlling microcomputer 8c determines NO at S6-5 if determining at S6-8 that the number of output pulses of the MR sensor 9 has not yet reached the aforementioned predetermined number of pulses. Specifically, this is the case where the amount of rotation of the lens drive ring 3 is insufficient even though the lens drive ring 3 has first slightly rotated by the driving force of the focusing motor FM and thereafter the lens drive ring 3 has stopped rotating. In this case also, the lens-controlling microcomputer 8c determines at S6-9 whether or not the time t1 (or t3) has elapsed, and the lens-controlling microcomputer 8c increases DUTY by one step from DUTY1 (or DUTY3) (S6-10) if the time t1 (or t3) has elapsed (if YES at S6-9). Thereafter, if YES at S6-5, the lens-controlling microcomputer 8c clears and resets the time t3 (or t1) following the process at S6-6, and the lens-controlling microcomputer 8c determines at S6-8 whether or not the number of output pulses of the MR sensor 9 has reached the aforementioned predetermined number of pulses. If the time t1 is set at a long period of time, it is sometimes the case that DUTY cannot be increased rapidly when the lens drive ring 3 cannot be rotated with DUTY1, hence, it is desirable for the time t1 to be set as a short period of time.

On the other hand, if the lens-controlling microcomputer 8c determines at S6-1 that the rotation direction in which the lens-controlling microcomputer 8c instructs the focusing motor FM to rotate is different from that in the data on the previous driving direction stored in the buffer memory 8c1 based on the result of a calculation of the AF circuit having received the result of a measurement by the distance measurer (if NO at S6-1), the lens-controlling microcomputer 8c determines that there is cumulative backlash in the rotation direction of the focusing motor FM (the moving direction of the second lens group L2) (S6-4). In addition, at S6-4, the lens-controlling microcomputer 8c sets DUTY (duty ratio) of the signal (output voltage) that the lens-controlling microcomputer 8c supplies to the focusing motor FM to DUTY3 (DUTY lower than DUTY1 (the normal driving DUTY)), and the lens-controlling microcomputer 8c sets a time t2 using the aforementioned timer. Subsequently, the lens-controlling microcomputer 8c generates a pulsing output voltage (signal) based on the input voltage (from the aforementioned battery) and DUTY3 and supplies this signal to the focusing motor FM to drive the focusing motor FM (S6-3). If YES at S6-5, the lens-controlling microcomputer 8c determines that the cumulative backlash in the rotation direction of the focusing motor FM has been eliminated, and control proceeds to S6-8 after performing the operations at S6-6 and S6-7; at this time, the value of DUTY (DUTY3) of the focusing motor FM is DUTY2 (see FIG. 10). If NO at S6-5, the lens-controlling microcomputer 8c determines whether or not the time t2 has elapsed (S6-9). If the time t2 has elapsed (if YES at S6-9), the lens-controlling microcomputer 8c increases DUTY by one step from DUTY3 (S6-10) and sets a time t3 (S6-11), and control returns to S6-5. Subsequently, if YES at S6-5, the lens-controlling microcomputer 8c clears and resets the time t3 (S6-7) following the process at S6-6 (the value of DUTY of the focusing motor FM of this time is DUTY2 if YES at S6-5 (see FIG. 10)), the lens-controlling microcomputer 8c determines whether or not the number of output pulses of the MR sensor 9 has reached the aforementioned predetermined number of pulses (S6-8), and control ends the autofocus actuation process and proceeds to S7 if the number of output pulses of the MR sensor 9 has reached the aforementioned predetermined number of pulses (if YES at S6-8). If the time t2 is set as a short period of time, there is a high possibility of the lens drive ring 3 being incapable of being rotated with DUTY3 (low DUTY) within the time t2. Accordingly, it is desirable that the time t2 be set as a long period of time (longer than the time t1).

Figure 12:
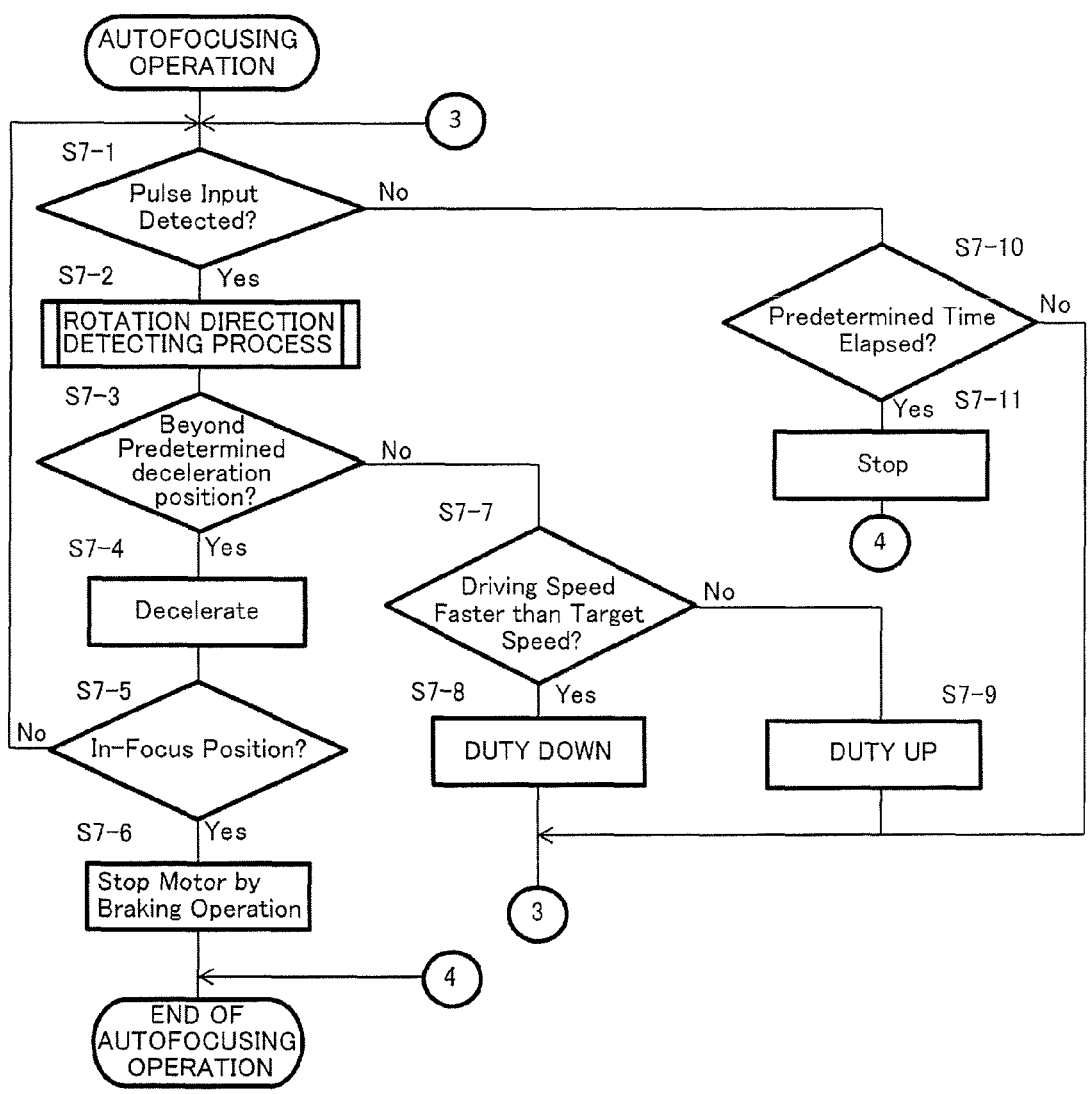
FIG. 12 is a flow chart of a subroutine shown in FIG. 6 that is performed during an AF operation.

After the autofocus actuation process at S6 is completed as described above, control proceeds to S7, i.e., to a subroutine "autofocusing process" shown in FIG. 12. First, the lens-controlling microcomputer 8c determines at S7-1 whether or not the MR sensor 9 (the detectors 9a and 9b) has output the detection result (pulse) to the lens-controlling microcomputer 8c (i.e., whether or not the lens drive ring 3 has been rotating), and if YES at S7-1, at S7-2 control again proceeds to the subroutine shown in FIG. 9 to rewrite (overwrite) the data stored in the buffer memory 8c1 (S4-5). Upon completion of the subroutine shown in FIG. 9, the lens-controlling microcomputer 8c determines at S7-3 whether or not the second lens group L2 has moved beyond a predetermined deceleration position (a position in front of an in-focus position by a predetermined distance). If the lens-controlling microcomputer 8c determines that the second lens group L2 has moved beyond the predetermined deceleration position (if YES at S7-3), the lens-controlling microcomputer 8c sends a signal to the focusing motor FM (e.g., with a reduced voltage application time) to decelerate the focusing motor FM (S7-4). If the lens-controlling microcomputer 8c determines that the second lens group L2 has reached an in-focus position (if YES at S7-5), the lens-controlling microcomputer 8c sends a brake signal to the focusing motor FM, which causes the focusing motor FM to stop rotating (S7-6), and control ends the autofocusing process and proceeds to S8. If NO at S7-3, the lens-controlling microcomputer 8c determines at S7-7 whether or not the driving speed of the focusing motor FM is faster than a target driving speed. If the driving speed of the focusing motor FM is faster than the target driving speed (if YES at S7-7), the lens-controlling microcomputer 8c decreases DUTY of the signal that the lens-controlling microcomputer 8c supplies to the focusing motor FM by one step (DUTY DOWN) (S7-8). If the driving speed of the focusing motor FM is not faster than the target driving speed (if NO at S7-7), the lens-controlling microcomputer 8c increases DUTY of the signal that the lens-controlling microcomputer 8c supplies to the focusing motor FM by one step (DUTY UP) (S7-9). In a modified embodiment of that shown in FIG. 12, it is possible to add an additional option to S7-7 for the case where the driving speed of the focusing motor FM is equal to the target driving speed, in which the DUTY of the signal would remain as it is without being increased or decreased. After either of the operations at S7-8 and S7-9, control returns to S7-1, so that the lens-controlling microcomputer 8c again determines whether or not the MR sensor 9 (the detectors 9a and 9b) has output the detection result (pulse) to the lens-controlling microcomputer 8c (i.e., whether or not the lens drive ring 3 has been rotating).

On the other hand, if NO at S7-1 (if the MR sensor 9 (the detectors 9a and 9b) has not output the detection result (pulse) to the lens-controlling microcomputer 8c), the lens-controlling microcomputer 8c determines at S7-10 whether or not the aforementioned time (t1, t2 or t3) has elapsed. If YES (if the aforementioned time (t1, t2 or t3) has elapsed) at S7-10, the lens-controlling microcomputer 8c stops sending the signal to the focusing motor FM so that the focusing motor FM stops rotating, thereby ending the autofocusing process (S7-11). On the other hand, if NO at S7-10, control returns to S7-1.

Upon the autofocusing process ending (S7-11; END OF AUTOFOCUSING OPERATION), the camera stops operating upon the main switch of the camera being turned OFF (if YES at S8) (e.g., after the shutter release button is fully depressed to take a picture).

Figure 10:
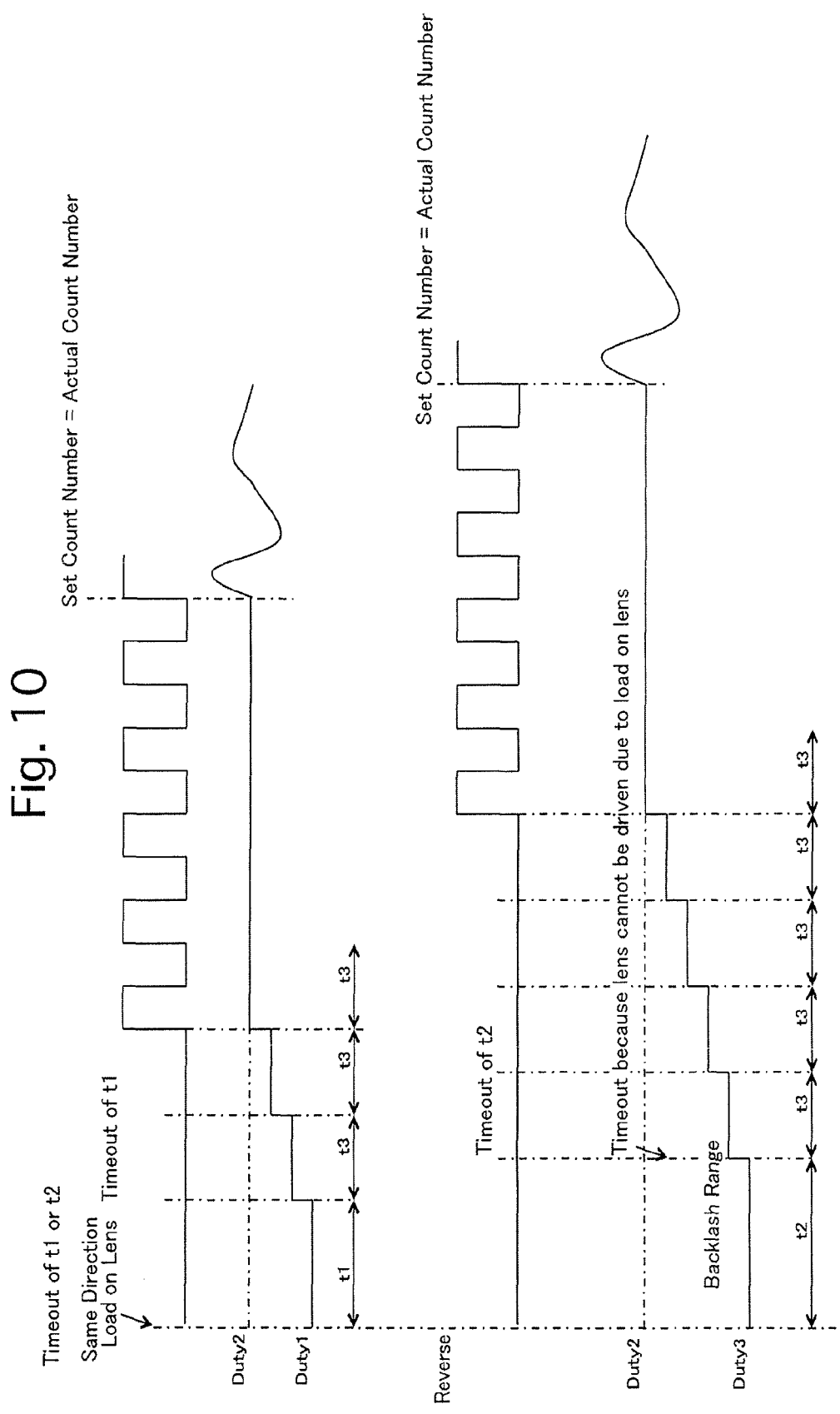
FIG. 10 is a timing chart of an example control operation of a focusing motor of the AF system is actuated and during an AF operation.
Figure 11:
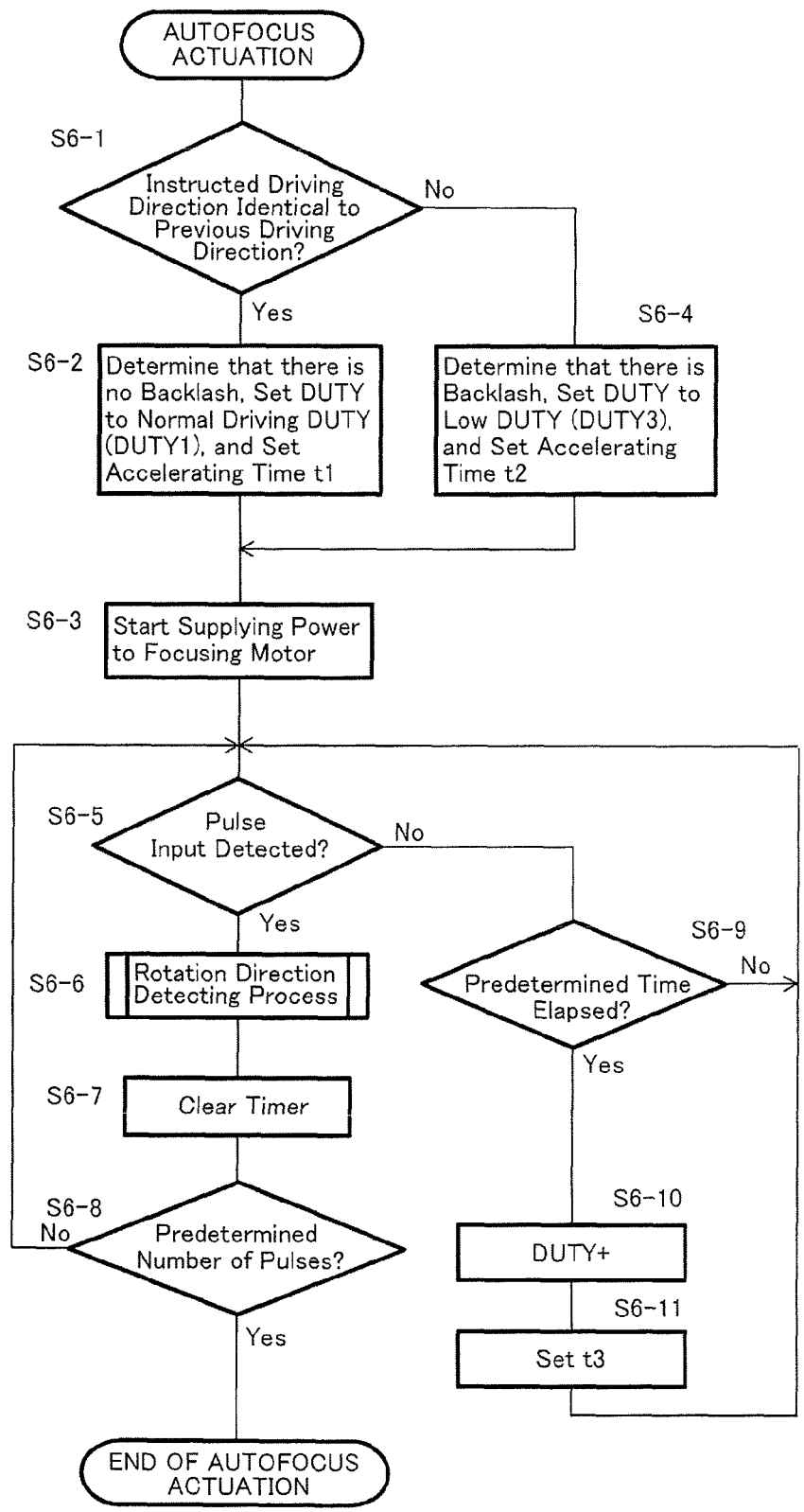
FIG. 11 is a flow chart of a subroutine shown in FIG. 6 that is performed upon actuation of the AF system.

The upper half of FIG. 10 shows an example where the focusing lens group cannot be driven with DUTY1, hence DUTY is increased (DUTY UP) upon a lapse of time t1, and thereafter, DUTY is increased by one step each time t3 elapses. The timer is cleared at each signal edge. The focusing lens is driven with DUTY 2, a signal (pulsing output voltage) is input, the AUTOFOCUS ACTUATION process ends upon a count value reaching a predetermined numerical value, and control moves to a state to control the driving speed of the focusing motor FM by varying DUTY.

The lower half of FIG. 10 shows an example where the focusing lens group is driven with DUTY3 in the backlash range; however, the load on the focusing lens group occurs upon completion of the focusing lens group driving in the backlash range. Hence, DUTY is increased (DUTY UP) upon a lapse of time t2, and thereafter, DUTY is increased by one step each time t3 elapses. The timer is cleared at each signal edge. The focusing lens group is driven with DUTY2, a signal (pulsing output voltage) is input, the AUTOFOCUS ACTUATION process ends upon a count value reaching a predetermined numerical value, and control moves to a state to control the driving speed of the focusing motor FM by varying DUTY.

As described above, in the present embodiment of the lens barrel 1 (the camera body 10), the lens-controlling microcomputer 8c detects whether or not the lens drive ring 3 has been rotated using the MR sensor 9 in either case where the lens drive ring 3 rotates by rotation of the focusing motor FM or the manual operation ring 6, and the lens-controlling microcomputer 8c controls the subsequent autofocusing operation using the result of the detection by the MR sensor 9. Namely, in the case where there is cumulative backlash in the rotation direction of the focusing motor FM in the lens barrel 1 when an autofocusing operation is performed, the focusing motor FM is driven with the rotational output (DUTY3) made smaller than the rotational output (DUTY1), with which the focusing motor FM rotates when there is no cumulative backlash in the rotation direction of the focusing motor FM. In addition, when the outer gear 3b of the lens drive ring 3, the power transmission clutch 5, the inner teeth 6a of the manual operation ring 6, the idle gear 7 and the rotational output pinion gear PG mutually contact (collide) and engage after idling (relatively rotating while in a noncontact state) by the amount of backlash, there is a possibility of a large impactive force occurring; however, this impactive force can be reduced according to the above described control. Additionally, the possibility of the second lens group L2 moving (slightly) beyond an original in-focus position as a result of fast rotation of such components (3b, 5, 6a, 7 and PG) can be reduced. Accordingly, even when an autofocusing operation is performed immediately after a manual focusing operation using the manual operation ring 6 is performed, an appropriate autofocusing operation according to the presence or absence of cumulative backlash in the rotation direction of the focusing motor FM can be performed.

By setting the torque using the gears 51, 52 and 53 as discussed above, during auto focusing, when the focusing motor FM is driven to rotate the first input gear 51, the output gear 53 rotates, whereby the lens drive ring 3 and the second lens group L2 move in the optical axis direction while the second input gear 52 remains stationary. Thus, focusing can be carried out without rotating the manual operation ring 6 even when To is large (even when the second lens group L2 is great in weight or when the load on the cam followers L2a which is caused by the cam profiles of the cam grooves 3a is great). In this case, when the second lens group L2 moves to either the frontmost or rearmost position (terminus position) (i.e., when the cam followers L2a come into contact with common ends of the linear guide grooves 2b or the aforementioned stoppers), the rotation of both the lens drive barrel 3 and the output gear 53 is locked (prohibited), however, almost no mechanical damage to the focusing motor FM is caused. This is because, although not illustrated in the drawings, the lens barrel 1 is provided in the vicinity of one end of at least one linear guide groove 2b with a detector which detects that the cam followers L2a have reached points close to the one ends of the linear guide grooves 2b. Upon this detector detecting that the cam followers L2a have reached the aforementioned points, the operation of the focusing motor FM is controlled to bring the cam followers L2a into contact with the common ends of the linear guide grooves 2b or the aforementioned stoppers while braking the focusing motor FM (e.g., controlling the operation of the focusing motor FM so that it rotates in the reverse direction) with consideration given to as to how much farther the cam followers L2a should move to come into contact with the common ends of the linear guide grooves 2b or the aforementioned stoppers. The focusing motor FM may be any motor, including a motor other than DC motor.

When the rotational torque is adjusted at the torque adjuster 55, the second input gear 52 is depressed in the axis direction against the output gear 53 as well as against the first input gear 51. Thus the shaft portions 54a and 54d of each of the planetary bevel gears 54 are respectively supportively sandwiched in between the first and second input gears 51 and 52, i.e., between the end surfaces 51e and 52e as well as between the sleeves 51c and 52c of the sun bevel gears 51b and 52b. Accordingly, the shaft portions 54a and 54d of each of the planetary gears 54 are supported in a closely contacting manner with the two input gears 51 and 52, which contributes to the minimizing of clearance in order to eliminate play around the shaft portions 54a and 54d. Therefore, with regard to the planetary gears 54, any potential eccentric rotation can be prevented, and a rotational output having high accuracy can be obtained by eliminating the play against the sun bevel gears 51b and 52b. In particular, with reference to the shaft portion 54d, the distance between the shaft centers of the input gears 51 and 52 can be adjusted by changing the thickness (diameter) of the shaft 54c, which further contributes to accurate production and cost reduction.

Figure 13:
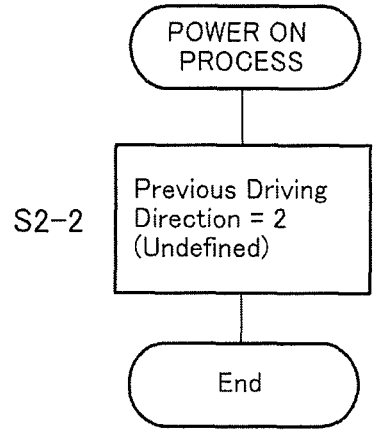
FIG. 13 shows a flow chart of a subroutine shown in FIG. 6, illustrating an operation when the power ON process is performed in a first modified embodiment.

Although the present invention has been described based on the above illustrated embodiment, the present invention is not limited solely thereto; various modifications to the above illustrated embodiment are possible. For instance, in a first modified embodiment shown in FIG. 13, the data on the previous driving direction that is stored in the aforementioned memory (not shown) is set at 2 (undefined) as a default value at S2-2 in the power ON process at S2. Therefore, if the operation at S6-1 is performed after the operation at S2-2 in the power ON process at S2 in this modified embodiment, the rotation direction of the lens drive ring 3 which is caused by rotation of the focusing motor FM when an autofocusing operation is performed does not coincide with that in the data on the previous driving direction "2", so that the lens-controlling microcomputer 8c invariably determines NO at S6-1. Accordingly, the focusing motor FM will be rotated with DUTY3 (low DUTY). The operations thereafter are identical to those in the above described embodiment.

Figure 14:
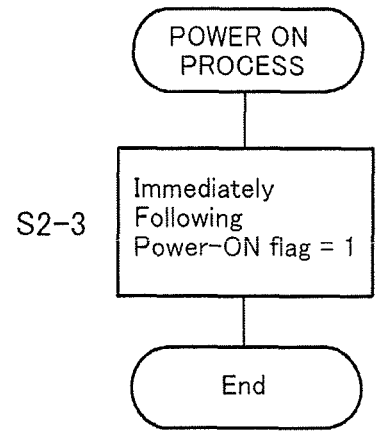
FIG. 14 is a flow chart of a subroutine shown in FIG. 6, illustrating an operation when the power ON process is performed in a second modified embodiment.
Figure 15:
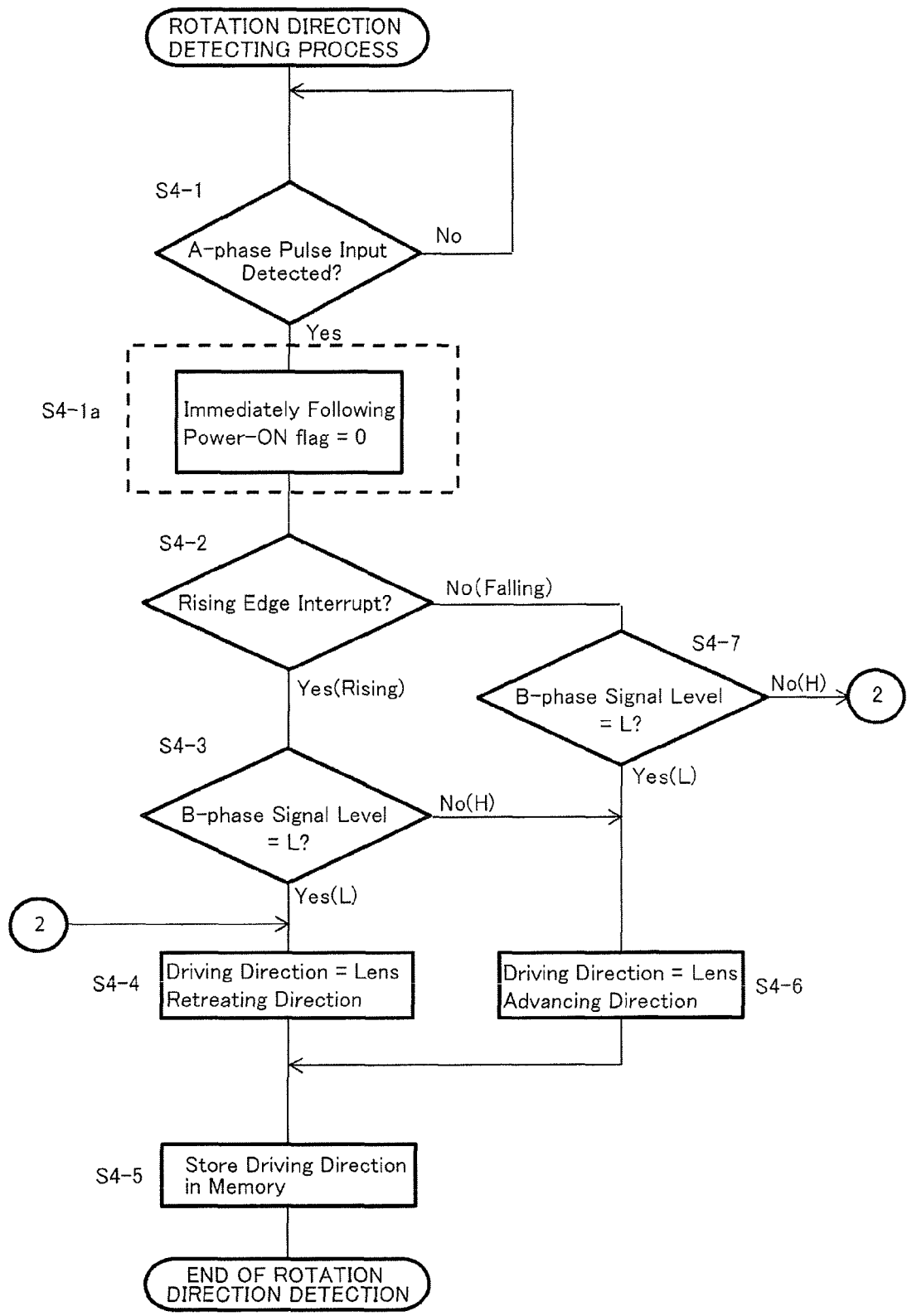
FIG. 15 is a flow chart of a subroutine shown in FIG. 6, illustrating the method of determining the moving direction of the movable lens group in the second modified embodiment.
Figure 16:
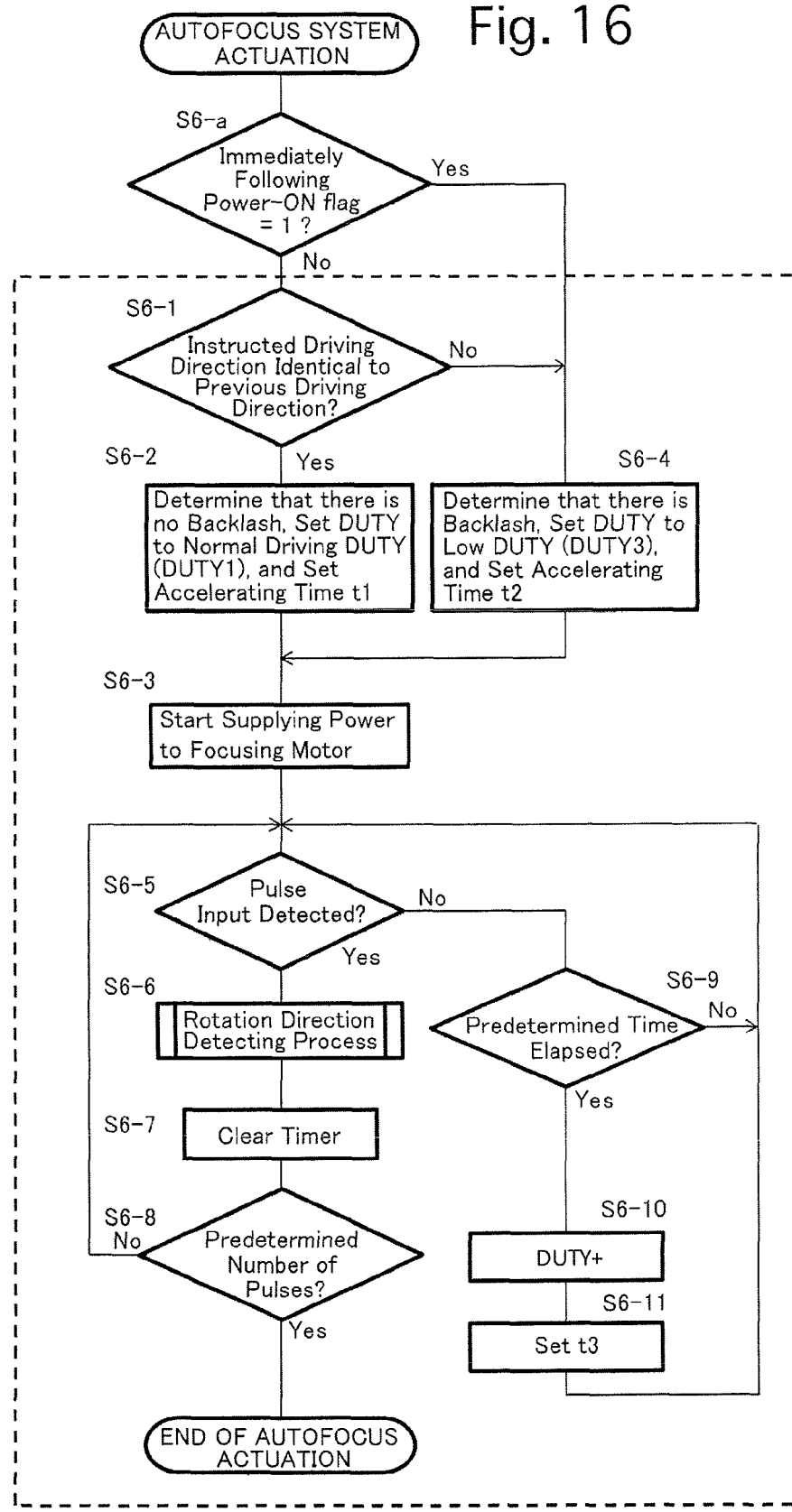
FIG. 16 is a flow chart of the subroutine shown in FIG. 6 that is performed upon actuation of AF system in the second modified embodiment.

In the second modified embodiment shown in FIGS. 14 through 16, the lens-controlling microcomputer 8c sets an immediately following power-ON flag at 1 (the immediately following power-ON flag=1) at S2-3 of the power ON process at S2 (see FIG. 14). In addition, when the manual operation ring 6 is manually rotated, the immediately following power-ON flag is set at 0 at S4-1a after S4-1 in the rotation direction detecting process at S4 shown in FIG. 15. It should be noted that the flow chart of FIG. 15 is the same as that of FIG. 9 except for step S4-la (which is surrounded by a broken line). Thereafter, when an autofocusing operation is performed without the manual operation ring 6 being manually operated, the immediately following power-ON flag is set at 1 (i.e., YES at S6-a), so that control proceeds to S6-4. Namely, the rotational output (DUTY) of the focusing motor FM changes to DUTY3 (low DUTY). Accordingly, in the second embodiment shown in FIGS. 14 through 16, in the case where no manual operation using the manual operation ring 6 is performed before an autofocusing operation is performed after the main switch of the camera body 10 is turned ON, this autofocusing operation (initial autofocusing operation) is performed with the focusing motor FM being rotated with DUTY3. The operations thereafter are identical to those in the above described embodiment.

Figure 17A:
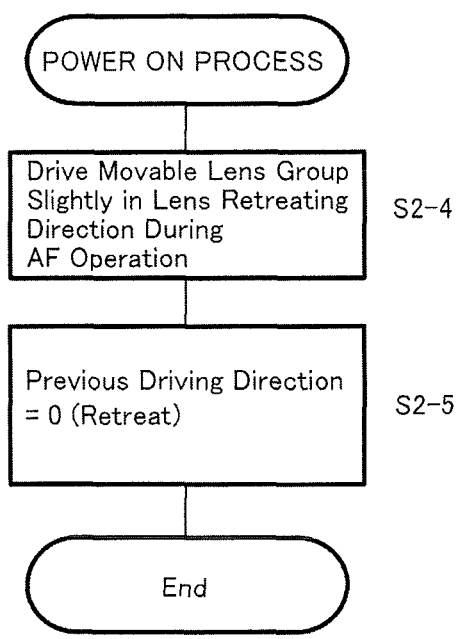
FIGS. 17A and 17B each show a flow chart of the subroutine shown in FIG. 6, illustrating operations when the power ON process is performed in a third modified embodiment.
Figure 17B:
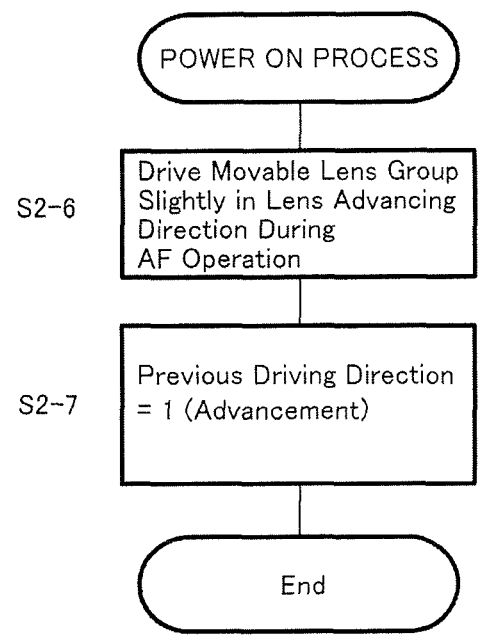

In the third embodiment shown in FIGS. 17A and 17B, upon the main switch of the camera body 10 being turned ON, the lens barrel 1 (and the camera body 10) automatically performs an autofocusing operation, and the lens-controlling microcomputer 8c stores the rotational direction of the focusing motor FM in the buffer memory 8c1 in accordance with the rotational direction of the focusing motor FM. However, it is ideal for the amount of rotation of the focusing motor FM at this time to be set to a slight amount sufficient to eliminate the aforementioned cumulative backlash or an amount slightly greater than this slight amount. Specifically, in the case where the moving direction of the second lens group L2 during autofocusing operation performed immediately after the main switch of the camera body 10 is turned ON is the lens retreating direction (S2-4), the lens-controlling microcomputer 8c writes "0 (lens retreat)" into the buffer memory 8c1 (S2-5) as shown in FIG. 17A. On the other hand, in the case where the moving direction of the second lens group L2 during autofocusing operation performed immediately after the main switch of the camera body 10 is turned ON is the lens advancing direction (S2-6), the lens-controlling microcomputer 8c writes "1 (lens advancement)" into the buffer memory 8c1 (S2-7) as shown in FIG. 17B. The operations thereafter are identical to those in the above described embodiment.

In each of the above described embodiment and modified embodiments, the numerals (0, 1) to be written into the aforementioned memory and the buffer memory 8c1 can be modified to be "1 (lens retreat)" and "0 (lens advancement). The rotational operation of the lens drive ring 3 can be directly detected with a sensor different from the MR sensor 9 (e.g., a photo interrupter). In addition, the rotational operation of the lens drive ring 3 can be indirectly detected by providing a first rotation detector which detects the rotational operation of the manual operation ring 6 (e.g., an MR sensor or a photo interrupter) and a second rotation detector which detects the rotational operation of the focusing motor FM (the output shaft FM1) (e.g., an MR sensor or a photo interrupter) (and further by connecting the first rotation detector and the second rotation detector to the lens-controlling microcomputer 8c).

The actuator (the focusing motor FM) can be configured from a motor other than a DC motor, e.g., from a stepping motor, a linear motor (this linear motor can be of either of the following two types: a type of linear motor which is equipped with at least one permanent magnet and at least one coil to generate a driving force in a direction parallel to an optical axis, and another type of linear motor in which at least one permanent magnet and at least one coil are fixed along a circumferential direction to one and the other of an annular stator and an annular rotor, respectively, each of which has its center on an optical axis to generate a driving force in a direction tangent to the aforementioned circumferential direction), an ultrasonic motor, or the like. In addition, in the case where the moving lens group (the second lens group L2) moves by, e.g., movement of the lens drive ring along the optical axis OA and rotation of the lens drive ring (e.g., a type of lens drive system adopted for video cameras (camcorders) and the like), it is possible for a linear movement type of linear motor to be adopted as an actuator which actuates the lens drive ring and for the manual operation ring to be connected to the lens drive ring. In this case also, since there is backlash in the power transmission mechanism (gear mechanism) provided inside the camera, the lens-driving controller can control the operation of the linear motor while detecting the moving direction of the lens drive ring using a sensor (e.g., a sensor which linearly detects movement of the lens drive ring, or a combination of a sensor which detects the operation of the linear motor and a sensor which detects movement of the manual operation ring).

Using the second lens group L2 as a movable lens group for zooming makes it possible to modify the lens barrel 1 into a so-called power zoom (motor-driven) lens barrel. In this case, the structure of the lens barrel can be applied to not only an interchangeable lens barrel but also to an imaging apparatus (compact camera, video camera (video camcorder), or television studio camera, etc.), in which a lens barrel is provided as a part thereof. The camera (imaging apparatus) including such a power zoom lens barrel according to the present invention performs an appropriate lens-driving operation according to the presence or absence of cumulative backlash in the rotation direction of an actuator when a power zoom operation (motor-driven zooming operation) is performed immediately after an manual focusing operation or a manual zoom operation is performed using the manual operation ring 6, and therefore, unusual noise due to cumulative backlash does not easily occur during a power zoom operation. This makes it possible to reduce the possibility of unusual noise due to cumulative backlash being recorded when a power zoom operation is performed during video shooting.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A lens barrel comprising:
   a lens drive ring which is actuated to drive a movable lens group along an optical axis;
   a driving direction detector which detects a driving direction of said lens drive ring;
   an actuator which actuates said lens drive ring;
   a power transmission which transmits a driving force of said actuator to said lens drive ring;
   a manual operator which is manually moved to actuate said lens drive ring; and
   a lens-driving controller which controls operations of said actuator to drive said lens drive ring to thereby move said movable lens group along said optical axis,
   wherein, when said lens drive ring is driven, said lens-driving controller controls a driving output of said actuator according to whether or not a first driving direction of said lens drive ring that is detected by said driving detection detector immediately before said lens drive ring is driven and a second driving direction of said lens drive ring that is currently detected by said driving detection detector are identical, and
   said lens-driving controller reduces said driving output of said actuator so that the driving output of said actuator is smaller when said first driving direction and said second driving direction of said lens drive ring are different than the driving output of said actuator when said first driving direction and said second driving direction of said lens drive ring are identical.

2. The lens barrel according to claim 1, wherein, upon startup of said actuator until backlash in said power transmission is eliminated, said lens-driving controller reduces said driving output of said actuator so that said driving output of said actuator is smaller when said first driving direction and said second driving direction of said lens drive ring are mutually different than the driving output of said actuator when said first driving direction and said second driving direction of said lens drive ring are identical.

3. The lens barrel according to claim 1, wherein said power transmission comprises:
   a power transmission clutch which actuates said lens drive ring without transmitting said driving force of said actuator to said manual operator when said actuator is actuated, and which actuates said lens drive ring without transmitting an operating force of said manual operator to said actuator when said manual operator is operated.

4. The lens barrel according to claim 1, wherein said driving direction detector detects said driving direction of said lens drive ring by directly detecting a rotation of said lens drive ring.

5. The lens barrel according to claim 4, wherein said driving direction detector comprises:
   a first detector which detects whether or not said lens drive ring operates at a first phase; and a second detector which detects whether or not said lens drive ring operates at a second phase, which is different from said first phase.

6. An imaging apparatus comprising:
a lens drive ring which is actuated to drive a movable lens group along an optical axis;
a driving direction detector which detects a driving direction of said lens drive ring;
an actuator which actuates said lens drive ring;
a power transmission which transmits a driving force of said actuator to said lens drive ring;
a manual operator which is manually moved to actuate said lens drive ring; and
a lens-driving controller which controls operations of said actuator to drive said lens drive ring to thereby move said movable lens group along said optical axis,
wherein, when said lens drive ring is driven, said lens-driving controller controls a driving output of said actuator according to whether or not a first driving direction of said lens drive ring that is detected by said driving detection detector immediately before said lens drive ring is driven and a second driving direction of said lens drive ring that is currently detected by said driving detection detector are identical, and
said lens-driving controller reduces said driving output of said actuator so that the driving output of said actuator is smaller when said first driving direction and said second driving direction of said lens drive ring are different than the driving output of said actuator when said first driving direction and said second driving direction of said lens drive ring are identical.

7. The imaging apparatus according to claim 6, wherein, upon startup of said actuator until backlash in said power transmission is eliminated, said lens-driving controller reduces said driving output of said actuator so that said driving output of said actuator is smaller when said first driving direction and said second driving direction of said lens drive ring are different than the driving output of said actuator when said first driving direction and said second driving direction of said lens drive ring are identical.

8. The imaging apparatus according to claim 6, wherein said power transmission comprises:
a power transmission clutch which actuates said lens drive ring without transmitting said driving force of said actuator to said manual operator when said actuator is actuated, and which actuates said lens drive ring without transmitting an operating force of said manual operator to said actuator when said manual operator is operated.

9. An imaging apparatus comprising:
a lens drive ring which is actuated to drive a movable lens group along an optical axis;
a driving direction detector which detects a driving direction of said lens drive ring;
an actuator which actuates said lens drive ring;
a power transmission which transmits a driving force of said actuator to said lens drive ring;
a manual operator which is manually moved to actuate said lens drive ring; and
a lens-driving controller which controls operations of said actuator to drive said lens drive ring to thereby move said movable lens group along said optical axis,
wherein, when said lens drive ring is driven, said lens-driving controller controls a driving output of said actuator according to whether or not a first driving direction of said lens drive ring that is detected by said driving detection detector immediately before said lens drive ring is driven and a second driving direction of said lens drive ring that is currently detected by said driving detection detector are identical, and
wherein said driving direction detector comprises a first detector which detects whether or not said lens drive ring operates at a first phase, and a second detector which detects whether or not said lens drive ring operates at a second phase which is different from said first phase.

10. The lens barrel according to claim 1, wherein, when the first driving direction of said lens drive ring, detected by said driving detection detector, is the same as the second driving direction of said lens drive ring, detected by said driving detection detector, said lens driving controller determines that there is no backlash in said actuator and sets a duty ratio of a signal supplied to said actuator to a first level, and when the first driving direction of said lens drive ring, detected by said driving detection detector, is different than the second driving direction of said lens drive ring, detected by said driving detection detector, said lens driving controller determines that there is backlash in said actuator and sets a duty ratio of the signal supplied to said actuator to a second level that is lower than the first level.

11. The imaging apparatus according to claim 6, wherein, when the first driving direction of said lens drive ring, detected by said driving detection detector, is the same as the second driving direction of said lens drive ring, detected by said driving detection detector, said lens driving controller determines that there is no backlash in said actuator and sets a duty ratio of a signal supplied to said actuator to a first level, and when the first driving direction of said lens drive ring, detected by said driving detection detector is different than a second driving direction of said lens drive ring, detected by said driving detection detector, said lens driving controller determines that there is backlash in said actuator and sets a duty ratio of the signal supplied to said actuator to a second level that is lower than the first level.

12. The imaging apparatus according to claim 9, wherein said power transmission comprises:
a power transmission clutch which actuates said lens drive ring without transmitting said driving force of said actuator to said manual operator when said actuator is actuated, and which actuates said lens drive ring without transmitting an operating force of said manual operator to said actuator when said manual operator is operated.

13. The lens barrel according to claim 9, wherein, when the first driving direction of said lens drive ring, detected by said driving detection detector, is the same as the second driving direction of said lens drive ring, detected by said driving detection detector, said lens driving controller determines that there is no backlash in said actuator and sets a duty ratio of a signal supplied to said actuator to a first level, and when the first driving direction of said lens drive ring, detected by said driving detection detector, is different than the second driving direction of said lens drive ring, detected by said driving detection detector, said lens driving controller determines that there is backlash in said actuator and sets a duty ratio of the signal supplied to said actuator to a second level that is lower than the first level.

14. The imaging apparatus according to claim 9, wherein, upon startup of said actuator until backlash in said power transmission is eliminated, said lens-driving controller reduces said driving output of said actuator so that said driving output of said actuator is smaller when said first driving direction and said second driving direction of said lens drive ring are different than the driving output of said actuator when said first driving direction and said second driving direction of said lens drive ring are identical.

* * * * *